United States Patent
Gould et al.

(10) Patent No.: US 11,068,540 B2
(45) Date of Patent: Jul. 20, 2021

(54) TECHNIQUES FOR INTEGRATING VALIDATION RESULTS IN DATA PROFILING AND RELATED SYSTEMS AND METHODS

(71) Applicant: Ab Initio Technology LLC, Lexington, MA (US)

(72) Inventors: Joel Gould, Arlington, MA (US); Stephen George Rybicki, Acton, MA (US)

(73) Assignee: Ab Initio Technology LLC, Lexington, MA (US)

( * ) Notice: Subject to any disclaimer, the term of this patent is extended or adjusted under 35 U.S.C. 154(b) by 143 days.

(21) Appl. No.: 15/880,279

(22) Filed: Jan. 25, 2018

(65) Prior Publication Data

US 2019/0228108 A1    Jul. 25, 2019

(51) Int. Cl.
*G06F 16/903* (2019.01)
*G06F 17/18* (2006.01)
*G06F 16/13* (2019.01)
*G06F 16/11* (2019.01)

(52) U.S. Cl.
CPC ...... *G06F 16/90344* (2019.01); *G06F 16/116* (2019.01); *G06F 16/13* (2019.01); *G06F 17/18* (2013.01)

(58) Field of Classification Search
CPC .......... G06F 16/90344; G06F 17/2247; G06F 17/2725; G06F 17/18; G06F 16/116; G06F 16/13
See application file for complete search history.

(56) References Cited

U.S. PATENT DOCUMENTS

| | | |
|---|---|---|
| 5,179,643 A | 1/1993 | Homma et al. |
| 5,566,072 A | 10/1996 | Momose et al. |
| 5,604,899 A | 2/1997 | Doktor |
| 5,742,806 A | 4/1998 | Reiner et al. |
| 5,842,200 A | 11/1998 | Agrawal et al. |
| 5,845,285 A | 12/1998 | Klein |
| 5,966,072 A | 10/1999 | Stanfill et al. |
| 6,134,560 A | 10/2000 | Kliebhan |

(Continued)

FOREIGN PATENT DOCUMENTS

| | | |
|---|---|---|
| CN | 1314634 A | 9/2001 |
| CN | 1749224 A | 3/2006 |

(Continued)

OTHER PUBLICATIONS

U.S. Appl. No. 10/941,373, filed Sep. 15, 2004, Gould et al.

(Continued)

*Primary Examiner* — Mark D Featherstone
*Assistant Examiner* — Ranjit P Doraiswamy
(74) *Attorney, Agent, or Firm* — Wolf, Greenfield & Sacks, P.C.

(57) ABSTRACT

According to some aspects, techniques for configuring a data processing system are provided that increase flexibility and efficiency of generation of a data profile of a dataset. The data processing system may produce a value census and a validation census of the dataset in separate processing steps. The value census may then be enriched with contents of the validation census by processing the validation census in a manner that allows matching of field-value pairs of the dataset between the two censuses.

15 Claims, 16 Drawing Sheets

(56) References Cited

U.S. PATENT DOCUMENTS

| | | | |
|---|---|---|---|
| 6,138,123 A | 10/2000 | Rathbun | |
| 6,163,774 A | 12/2000 | Lore | |
| 6,343,294 B1 | 1/2002 | Hawley | |
| 6,546,416 B1 | 4/2003 | Kirsch | |
| 6,553,366 B1 | 4/2003 | Miller et al. | |
| 6,601,048 B1 | 7/2003 | Gavan et al. | |
| 6,657,568 B1 | 12/2003 | Coelho et al. | |
| 6,741,995 B1 | 5/2004 | Chen et al. | |
| 6,788,302 B1 | 9/2004 | Ditlow et al. | |
| 6,801,938 B1 | 10/2004 | Bookman et al. | |
| 6,839,682 B1 | 1/2005 | Blume et al. | |
| 6,879,976 B1 | 4/2005 | Brookler et al. | |
| 6,952,693 B2 | 10/2005 | Wolff et al. | |
| 6,957,225 B1 | 10/2005 | Zait et al. | |
| 6,959,300 B1 | 10/2005 | Caldwell et al. | |
| 7,013,290 B2 | 3/2006 | Ananian | |
| 7,031,843 B1 | 4/2006 | Bullard | |
| 7,032,212 B2 | 4/2006 | Amir et al. | |
| 7,039,627 B1 | 5/2006 | Modelski et al. | |
| 7,043,476 B2 | 5/2006 | Robson | |
| 7,047,230 B2 | 5/2006 | Gibbons | |
| 7,058,819 B2 | 6/2006 | Okaue | |
| 7,117,222 B2 | 10/2006 | Santosuosso | |
| 7,130,760 B2 | 10/2006 | Ilic | |
| 7,149,736 B2 | 12/2006 | Chkodrov et al. | |
| 7,359,847 B2 | 4/2008 | Gabele et al. | |
| 7,376,656 B2 | 5/2008 | Blakeley et al. | |
| 7,386,318 B2 | 6/2008 | Moon et al. | |
| 7,392,169 B2 | 6/2008 | Gabele et al. | |
| 7,395,243 B1 | 7/2008 | Zielke et al. | |
| 7,403,942 B1 | 7/2008 | Bayliss | |
| 7,426,520 B2 | 9/2008 | Gorelik et al. | |
| 7,433,861 B2 | 10/2008 | Santosuosso | |
| 7,584,205 B2 | 9/2009 | Stanfill et al. | |
| 7,587,394 B2 | 9/2009 | Chang et al. | |
| 7,689,542 B2 | 3/2010 | Yoaz et al. | |
| 7,694,088 B1 | 4/2010 | Bromley et al. | |
| 7,698,163 B2 | 4/2010 | Reed et al. | |
| 7,698,345 B2 | 4/2010 | Samson et al. | |
| 7,720,878 B2 | 5/2010 | Caldwell et al. | |
| 7,756,873 B2 | 7/2010 | Gould et al. | |
| 7,774,346 B2 | 8/2010 | Hu et al. | |
| 7,813,937 B1 | 10/2010 | Pathria et al. | |
| 7,849,075 B2 | 12/2010 | Gould et al. | |
| 7,877,350 B2 | 1/2011 | Stanfill et al. | |
| 7,899,833 B2 | 3/2011 | Stevens et al. | |
| 7,904,464 B2 | 3/2011 | Golwalkar et al. | |
| 7,912,867 B2 | 3/2011 | Suereth et al. | |
| 7,958,142 B2 | 6/2011 | Li et al. | |
| 7,966,305 B2 | 6/2011 | Olsen | |
| 8,069,129 B2 | 11/2011 | Gould et al. | |
| 8,122,046 B2 | 2/2012 | Chang et al. | |
| 8,145,642 B2 | 3/2012 | Cruanes et al. | |
| 8,250,044 B2 | 8/2012 | Santosuosso | |
| 8,271,452 B2 | 9/2012 | Longshaw | |
| 8,296,274 B2 | 10/2012 | Leppard | |
| 8,326,824 B2 | 12/2012 | Agrawal et al. | |
| 8,359,296 B2 | 1/2013 | Santosuosso | |
| 8,396,873 B2 | 3/2013 | Xie | |
| 8,412,713 B2 | 4/2013 | Stewart et al. | |
| 8,447,743 B2 | 5/2013 | Santosuosso | |
| 8,463,739 B2 | 6/2013 | Williamson | |
| 8,560,575 B2 | 10/2013 | Gradin | |
| 8,572,018 B2 | 10/2013 | Mishra et al. | |
| 8,615,519 B2 | 12/2013 | Froemmgen | |
| 8,666,919 B2 | 3/2014 | Miranda | |
| 8,762,396 B2 | 6/2014 | Hudzia et al. | |
| 8,775,447 B2 | 7/2014 | Roberts | |
| 8,825,695 B2 | 9/2014 | Studer et al. | |
| 8,856,085 B2 | 10/2014 | Gorelik | |
| 8,868,580 B2 | 10/2014 | Gould et al. | |
| 8,924,402 B2 | 12/2014 | Fuh et al. | |
| 9,251,212 B2 | 2/2016 | Cao et al. | |
| 9,275,367 B2 | 3/2016 | Neway | |
| 9,323,748 B2 | 4/2016 | Anderson et al. | |
| 9,323,749 B2 | 4/2016 | Anderson et al. | |
| 9,323,802 B2 * | 4/2016 | Gould | G06F 16/252 |
| 9,336,246 B2 | 5/2016 | Gorelik | |
| 9,449,057 B2 | 9/2016 | Anderson et al. | |
| 9,569,434 B2 | 2/2017 | Anderson et al. | |
| 9,652,513 B2 | 5/2017 | Anderson et al. | |
| 9,892,026 B2 | 2/2018 | Isman et al. | |
| 9,971,798 B2 | 5/2018 | Khan et al. | |
| 9,990,362 B2 | 6/2018 | Anderson et al. | |
| 10,719,511 B2 | 7/2020 | Anderson | |
| 2002/0073138 A1 | 6/2002 | Gilbert et al. | |
| 2002/0120602 A1 | 8/2002 | Overbeek et al. | |
| 2002/0161778 A1 | 10/2002 | Linstedt | |
| 2002/0198877 A1 | 12/2002 | Wolff et al. | |
| 2003/0023868 A1 | 1/2003 | Parent | |
| 2003/0033138 A1 | 2/2003 | Bangalore et al. | |
| 2003/0063779 A1 | 4/2003 | Wrigley | |
| 2003/0135354 A1 | 7/2003 | Gabele | |
| 2003/0140027 A1 | 7/2003 | Huttel et al. | |
| 2003/0208744 A1 | 11/2003 | Amir et al. | |
| 2004/0023666 A1 | 2/2004 | Moon et al. | |
| 2004/0049492 A1 | 3/2004 | Gibbons | |
| 2004/0073534 A1 | 4/2004 | Robson | |
| 2004/0083199 A1 | 4/2004 | Govindugari et al. | |
| 2004/0111410 A1 | 6/2004 | Burgoon et al. | |
| 2004/0181514 A1 | 9/2004 | Santosuosso | |
| 2004/0181533 A1 | 9/2004 | Santosuosso | |
| 2004/0249810 A1 | 12/2004 | Das et al. | |
| 2004/0260711 A1 | 12/2004 | Chessell | |
| 2005/0048564 A1 | 3/2005 | Emili | |
| 2005/0055369 A1 | 3/2005 | Gorelik | |
| 2005/0065914 A1 | 3/2005 | Chang et al. | |
| 2005/0071320 A1 | 3/2005 | Chkodrov | |
| 2005/0075831 A1 | 4/2005 | Ilic | |
| 2005/0102297 A1 | 5/2005 | Lloyd et al. | |
| 2005/0102325 A1 | 5/2005 | Gould et al. | |
| 2005/0108631 A1 | 5/2005 | Amorin et al. | |
| 2005/0114368 A1 | 5/2005 | Gould et al. | |
| 2005/0114369 A1 | 5/2005 | Gould et al. | |
| 2005/0154715 A1 | 7/2005 | Yoaz et al. | |
| 2005/0177578 A1 | 8/2005 | Chen et al. | |
| 2005/0183094 A1 | 8/2005 | Hunt | |
| 2005/0192994 A1 | 9/2005 | Caldwell et al. | |
| 2005/0240354 A1 | 10/2005 | Mamou | |
| 2006/0041544 A1 | 2/2006 | Santosuosso | |
| 2006/0064313 A1 | 3/2006 | Steinbarth et al. | |
| 2006/0069717 A1 | 3/2006 | Mamou | |
| 2006/0074881 A1 | 4/2006 | Vembu et al. | |
| 2006/0089827 A1 | 4/2006 | Gabele | |
| 2006/0294055 A1 | 12/2006 | Santosuosso | |
| 2006/0294129 A1 | 12/2006 | Stanfill et al. | |
| 2007/0011668 A1 | 1/2007 | Wholey et al. | |
| 2007/0021995 A1 | 1/2007 | Toklu et al. | |
| 2007/0050381 A1 | 3/2007 | Hu et al. | |
| 2007/0073721 A1 | 3/2007 | Belyy et al. | |
| 2007/0106666 A1 | 5/2007 | Beckerle et al. | |
| 2007/0214179 A1 | 9/2007 | Hoang | |
| 2007/0288490 A1 | 12/2007 | Longshaw | |
| 2007/0299832 A1 | 12/2007 | Chang et al. | |
| 2008/0071904 A1 | 3/2008 | Schuba et al. | |
| 2008/0114789 A1 | 5/2008 | Wysham | |
| 2008/0140646 A1 | 6/2008 | Inoue et al. | |
| 2008/0189269 A1 | 8/2008 | Olsen | |
| 2008/0215602 A1 | 9/2008 | Samson et al. | |
| 2008/0222089 A1 | 9/2008 | Stewart et al. | |
| 2008/0306920 A1 | 12/2008 | Santosuosso | |
| 2008/0319942 A1 | 12/2008 | Courdy et al. | |
| 2009/0216717 A1 | 8/2009 | Suereth et al. | |
| 2009/0226916 A1 | 9/2009 | DeSimas | |
| 2010/0057697 A1 | 3/2010 | Golwalkar | |
| 2010/0057777 A1 | 3/2010 | Williamson | |
| 2010/0114976 A1 | 5/2010 | Castellanos | |
| 2010/0250563 A1 | 9/2010 | Wu et al. | |
| 2011/0029478 A1 | 2/2011 | Broeker | |
| 2011/0040874 A1 | 2/2011 | Dugatkin | |
| 2011/0066602 A1 | 3/2011 | Studer et al. | |
| 2011/0119221 A1 | 5/2011 | Mishra | |
| 2011/0137940 A1 | 6/2011 | Gradin | |
| 2011/0153667 A1 | 6/2011 | Parmenter et al. | |

(56) References Cited

U.S. PATENT DOCUMENTS

| | | |
|---|---|---|
| 2011/0225191 A1 | 9/2011 | Xie |
| 2011/0296108 A1 | 12/2011 | Agrawal |
| 2011/0313979 A1 | 12/2011 | Roberts |
| 2012/0158745 A1 | 6/2012 | Gorelik |
| 2012/0197887 A1 | 8/2012 | Anderson et al. |
| 2012/0250563 A1 | 10/2012 | Liu et al. |
| 2012/0281012 A1 | 11/2012 | Neway |
| 2012/0323927 A1 | 12/2012 | Froemmgen |
| 2013/0006931 A1 | 1/2013 | Nelke et al. |
| 2013/0024430 A1 | 1/2013 | Gorelik |
| 2013/0031044 A1 | 1/2013 | Miranda et al. |
| 2013/0031367 A1 | 1/2013 | Mao et al. |
| 2013/0100957 A1 | 4/2013 | Suzuki et al. |
| 2013/0159353 A1 | 6/2013 | Fuh |
| 2013/0166576 A1 | 6/2013 | Hudzia et al. |
| 2013/0247008 A1 | 9/2013 | Mitran et al. |
| 2014/0047015 A1 | 2/2014 | Sheshagiri et al. |
| 2014/0095233 A1 | 4/2014 | Yeung |
| 2014/0114926 A1 | 4/2014 | Anderson et al. |
| 2014/0114927 A1 | 4/2014 | Anderson et al. |
| 2014/0114968 A1 | 4/2014 | Anderson et al. |
| 2014/0114987 A1 | 4/2014 | Hoeng et al. |
| 2014/0115013 A1 | 4/2014 | Anderson et al. |
| 2014/0147013 A1 | 5/2014 | Shandas |
| 2014/0222752 A1 | 8/2014 | Isman et al. |
| 2014/0294993 A1 | 10/2014 | Bueno et al. |
| 2015/0106341 A1 | 4/2015 | Gould et al. |
| 2015/0199352 A1 | 7/2015 | Bush et al. |
| 2015/0220838 A1 | 8/2015 | Martin |
| 2015/0254292 A1* | 9/2015 | Khan .................. G06F 16/2228 707/741 |
| 2016/0012100 A1 | 1/2016 | Anderson et al. |
| 2016/0232115 A1 | 2/2016 | Sawal et al. |
| 2016/0078100 A1 | 3/2016 | Anderson et al. |
| 2016/0239532 A1 | 8/2016 | Gould et al. |
| 2017/0139996 A1 | 5/2017 | Marquardt et al. |
| 2017/0154075 A1 | 6/2017 | Anderson et al. |
| 2018/0165181 A1 | 6/2018 | Isman et al. |

FOREIGN PATENT DOCUMENTS

| | | |
|---|---|---|
| CN | 1853181 A | 10/2006 |
| CN | 1993755 A | 7/2007 |
| CN | 101191069 A | 6/2008 |
| CN | 101208696 A | 6/2008 |
| CN | 101271471 A | 9/2008 |
| CN | 101271472 A | 9/2008 |
| CN | 101661510 A | 3/2010 |
| CN | 102203773 A | 9/2011 |
| CN | 102436420 A | 5/2012 |
| CN | 102681946 A | 9/2012 |
| CN | 103080932 A | 5/2013 |
| CN | 103348598 A | 10/2013 |
| EP | 1136918 A1 | 9/2001 |
| EP | 1302871 A2 | 4/2003 |
| EP | 2261820 A2 | 12/2010 |
| JP | 03-002938 A | 1/1991 |
| JP | H07-502617 A | 3/1995 |
| JP | 08-030637 A | 2/1996 |
| JP | 10-055367 A | 2/1998 |
| JP | 10-091633 A | 4/1998 |
| JP | 10-320423 A | 12/1998 |
| JP | 11-238065 A | 8/1999 |
| JP | 2001-43237 A | 2/2001 |
| JP | 2001-142827 A | 5/2001 |
| JP | 2002-024262 A | 1/2002 |
| JP | 2007-066017 A | 3/2007 |
| JP | 2010-072823 A | 4/2010 |
| JP | 2012-038066 A | 2/2012 |
| JP | 2012-503256 A | 2/2012 |
| KR | 10-2006-0080588 A | 7/2006 |
| WO | WO 00/10103 A1 | 2/2000 |
| WO | WO 00/57312 A1 | 9/2000 |
| WO | WO 00/79415 A2 | 12/2000 |
| WO | WO 03/071450 A2 | 8/2003 |
| WO | WO 2005/029369 A2 | 3/2005 |
| WO | WO 2009/095981 A1 | 8/2009 |
| WO | WO 2010/033834 A1 | 3/2010 |

OTHER PUBLICATIONS

U.S. Appl. No. 10/941,401, filed Sep. 15, 2004, Gould et al.
U.S. Appl. No. 10/941,402, filed Sep. 15, 2004, Gould et al.
U.S. Appl. No. 13/360,230, filed Jan. 27, 2012, Anderson et al.
U.S. Appl. No. 13/827,558, filed Mar. 14, 2013, Isman et al.
U.S. Appl. No. 13/957,641, filed Aug. 2, 2013, Anderson et al.
U.S. Appl. No. 13/957,664, filed Aug. 2, 2013, Anderson et al.
U.S. Appl. No. 13/958,057, filed Aug. 2, 2013, Anderson et al.
U.S. Appl. No. 14/059,590, filed Oct. 22, 2013, Anderson et al.
U.S. Appl. No. 14/156,544, filed Jan. 16, 2014, Bush et al.
U.S. Appl. No. 14/519,030, filed Oct. 20, 2014, Gould et al.
U.S. Appl. No. 14/625,902, filed Feb. 19, 2015, Khan et al.
U.S. Appl. No. 14/859,502, filed Sep. 21, 2015, Anderson et al.
U.S. Appl. No. 14/954,434, filed Nov. 30, 2015, Anderson et al.
U.S. Appl. No. 15/135,852, filed Apr. 22, 2016, Gould et al.
U.S. Appl. No. 15/431,008, filed Feb. 13, 2017, Anderson et al.
AU 2009200294, Jun. 12, 2012, Examiner's Report.
CA 2,655,731, Dec. 3, 2009, Canadian Communication.
CA 2,655,735, May 4, 2009, Canadian Communication.
CN 201210367944.3, Mar. 27, 2015, Chinese First Office Action.
CN 201210367944.3, Nov. 4, 2015, Chinese Communication.
EP 04784113.5, Jul. 30, 2010, Summons to Attend Oral Proceedings.
EP 14746291.5, Sep. 5, 2016, European Search Report.
JP 2006-526986, Oct. 13, 2010, Notification of Reasons for Refusal
JP 2006-526986, Nov. 22, 2012, Japanese Communication.
JP 2010-153799, May 8, 2012, Japanese Communication.
JP 2010-153799, Feb. 12, 2013, Japanese Communication.
JP 2010-153800, May 8, 2012, Japanese Communication.
JP 2013-551372, Oct. 27, 2015, Notification of Reasons for Refusal.
PCT/US2012/022905, May 2, 2012, International Search Report and Written Opinion.
PCT/US2013/053351, Oct. 25, 2013, International Search Report and Written Opinion.
PCT/US2014/014186, Aug. 20, 2014, International Search Report and Written Opinion.
PCT/US2015/011518, May 12, 2015, International Search Report and Written Opinion.
PCT/US2015/011518, Jul. 19, 2016, International Preliminary Report on Patentability.
PCT/US2015/016517, May 18, 2015, International Search Report and Written Opinion.
PCT/US2018/015274, Jul. 24, 2018, International Search Report and Written Opinion.
Australian Examiner's Report for Australian Application No. 2009200294 dated Jun. 12, 2012.
Canadian Communication for Canadian Application No. 2,655,731 dated Dec. 3, 2009.
Canadian Communication for Canadian Application No. 2,655,735 dated May 4, 2009.
Chinese First Office Action for Chinese Application No. 201210367944.3 dated Mar. 27, 2015.
Chinese Communication for Chinese Application No. 201210367944.3 dated Nov. 4, 2015.
Summons to Attend Oral Proceedings for EP Application No. 04784113.5 dated Jul. 30, 2010.
European Search Report for European Application No. 14746291.5 dated Sep. 5, 2016.
English Translation of Notification of Reasons for Refusal for Japanese Application No. 2006-526986 dated Oct. 13, 2010.
Japanese Communication for Japanese Application No. 2006-526986 dated Nov. 22, 2012.
Japanese Communication for Japanese Application No. 2010-153799 dated May 8, 2012.
Japanese Communication for Japanese Application No. 2010-153799 dated Feb. 12, 2013.

(56) References Cited

OTHER PUBLICATIONS

Japanese Communication for Japanese Application No. 2010-153800 dated May 8, 2012.
English Translation of Notification of Reasons for Refusal for Japanese Application No. 2013-551372 dated Oct. 27, 2015.
International Search Report and Written Opinion for International Application No. PCT/US2012/022905 dated May 2, 2012.
International Search Report and Written Opinion for International Application No. PCT/US2013/053351 dated Oct. 25, 2013.
International Search Report and Written Opinion for International Application No. PCT/US2014/014186 dated Aug. 20, 2014.
International Search Report and Written Opinion for International Application No. PCT/US2015/011518 dated May 12, 2015.
International Preliminary Report on Patentability for International Application No. PCT/US2015/011518 dated Jul. 19, 2016.
International Search Report and Written Opinion for International Application No. PCT/US2015/016517 dated May 18, 2015.
International Search Report and Written Opinion for International Application No. PCT/US2018/015274 dated Jul. 24, 2018.
[No Author Listed], Ascential Software. http://www.ascentialsoftware.com (2003). 15 pages.
[No Author Listed], Avellino. http://www.avellino.com (2003). 8 pages.
[No Author Listed], Data Profiling: The Foundation for Data Management. DataFlux Corporation. XP-002313258. 2004. 17 pages.
[No Author Listed], Evoke. Evoke Software. http://www.evokesoftware.com 2003. 71 pages.
[No Author Listed], Profiling: Take the First Step Toward Assuring Data Quality. IBM. White paper, GC-18-9728-00, Dec. 2005. 16 pages.
Alur et al., IBM Websphere Information Analyzer and Data Quality Assessment. ibm.com/redbooks Dec. 2007 p. 1-642, retrieved from the Internet:http://www.ibm.com/redbooks/pdfs/sg247508.pdf.
Apte et al., Business Application for Data Mining. Communications of the ACM. Aug. 2002;45(8):49-53.
Bagchi et al., Dependency Interference Algorithms for Relational Database Design. Computers in Industry. 14. 1990;4:319-50.
Bell et al., Discovery of Data Dependencies in Relational Databases. University of Dortmund, LS-8, Report 14, Apr. 3, 1995. 22 pages.
Bitton et al., A Feasability and Performance Study of Dependency Inference. Department of Electrical Engineering and Computer Science, University of Illinois at Chicago. IEEE.1989;635-41.
Brown et al., BHUNT: Automatic Discovery of Fuzzy Algebraic Contraints in Relational Data. 29th VLDB Conference. Sep. 9, 2003. XP-002333907. 12 pages.
Bruno et al., Efficient Creation of Statistics over Query Expressions. The Computer Society. 2003;201-12.
Chaudhuri., An Overview of Query Optimization on Relational Systems. Proceedings of the 17th ACM Sigact-Sigmod-Sigart Symposium on Principles of Database Systems. 1998;34-43. XP-000782631.
Chilimbi et al., Quantifying the Effectiveness of Testing via Efficient Residual Path Profiling. Proceeding ESEC-FSE companion '07. The 6th Joint Meeting on European software engineering conference and the ACM SIGSOFT symposium on the foundations of software engineering. 2007;545-8.
Cox et al., Integrating gene and protein expression data: pattern analysis and profile mining. Methods. Mass Spectrometry in Proteomics. 2005;35(3):303-14.
Dasu et al., Mining Database Structure; Or, How to Build a Data Quality Browser. ACM SIGMOD. 2002;240-51.
Florescu et al., A Performance Evaluation of Alternative Mapping Schemes for Storing XML Data in a Relational Database. INRIA Rocquencourt. May 1999. 31 pages.
Gauch et al., User Profiles for Personalized Information Access. The Adaptive Web, LNCS 4321. 2007;54-89.
Graefe, Query Evaluation Techniques for Large Databases. ACM Computing Surveys. 1993;25(2):98 pages.

Henrad et al., Data Dependency Elicitation in Database Reverse Engineering. Institut d'Informattique. University of Namur, Belgium., 2001;11-9.
Huhtala et al., Efficient Discovery of Functional and Approximate Dependencies Using Paritions. Proceedings of the 14th International Conference on Data Engineering. Feb. 23-27, 1998. 12 pages.
Huhtala et al., Efficient Discovery of Functional and Approximate Dependencies Using Partitions (Extended Version). University of Helsinki, Department of Computer Science Series of Publications C, Report C-1997-79, Nov. 1997. 35 pages.
Huhtala et al., TANE: An Efficient Algorithm for Discovering Functional and Approximate Dependencies. The Computer Journal. 1999;42(2):100-11.
Jaedicke et al., On Parallel Processing of Aggregate and Scalar Functions in Object-Relational DBMS. ACM. 1998;XP-002313223:379-89.
Jahnke et al., Adaptive Tool Support for Database Reverse Engineering. AG-Softwaretechnik, Universitat Paderborn, Germany. IEEE. 1999;278-82.
Johnson et al., Comparing Massive High-Dimensional Data Sets. Proceedings of the 4th International Conference on Knowledge Discovery and Data Mining (KDD 98). Aug. 27-31, 1998;229-33.
Kandel et al., Profiler: Integrated Statistical Analysis and Visualization for Data Quality Assessment. AVI '12 Proceedings of the International Working Conference on Advanced Visual Interfaces. May 2012;1-8.
Kivinen et al., Approximate Inference of Functional Dependencies from Relations. Theoretical Computer Science. 1995;149:129-49.
Kouris et al., Using Information Retrieval Techniques for Supporting Data Mining. Data & Knowledge Engineering. Elsevier BC, NL. 2005;52(3):353-83.
Lee et al., Bitmap Indexes for Relational XML Twig Query Processing. OIKM '09, Nov. 2-6, 2009;465-74.
Lemire et al., Sorting Improves Word-Aligned Bitmap Indexes. Data & Knowledge Engineering. Dec. 2009;1-43.
Li et al., A Practical External Sort for Shared Disk MPPs. http://www.thearling.com/text/sc93/sc93. Thearling. 1993. 24 pages.
Lopes et al., Efficient Discovery of Functional Dependencies and Armstrong Relations. Proceedings of the 7th International Conference on Extending Database Technology (EDBT 2000), LNCS 1777. Mar. 27-31, 2000;350-64.
Lynch, Canonicalization: a fundamental tool to facilitate preservation and management of digital information. D-Lib Magazine. 1999;5(9):1-7.
Mannila, Theoretical Frameworks for Data Mining. SIGKDD Explorations. Jan. 2000;1(2):30-2.
Milne et al., Predicting Paper Making Defects On-line Using Data Mining. Knowledge-Based Systems. Jul. 24, 1998;11:331-8.
Mobasher, Data Mining for Web Personalization. The Adaptive Web, LNCS 4321. 2007;90-135.
Munakata, Integration of Distributed Heterogeneous Information Sources. Systems, Control and Infollnation, Japan, The Institute of Systems, Control and Infolination Engineers, Dec. 15, 1996;40(12):514-21.
Naumann, Data Profiling Revisited. SIGMOD Record. 2014;42,(4):40-9.
Novelli et al., FUN: An Efficient Algorithm for Mining Functional and Embedded Dependencies. Proceedings of the 8th International Conference on Database Theory (ICDT 2001), LNCS 1973. Jan. 4-6, 2001;189-203.
Olsen, Data Profiling Technology, Chapters 7 and 8. Elsevier Science. Jan. 2003. 23 pages.
Olson, Know Your Data: Data Profiling Solutions for Today's Hot Projects. DM Review, XP-002313222. 2000;1-4.
Petit et al., Towards the Reverse Engineering of Denormalizes Relational Databases. Laboratoire d'Ingeenierie des Systemes d'Information, Lyon. 1996;218-27.
Rahm et al., Data Cleaning: Problems and Current Approaches. XP-002284896. 2000. 12 pages.
Wyss et al., FastFDs: A Heuristic-Driven, Depth-First Algorithm for Mining Functional Dependencies from Relation Instances. (Extended Abstract) Computer Science Department, Indiana University. XP-002333906, 2001;101-10.

(56) References Cited

OTHER PUBLICATIONS

Yan et al., Algorithm for discovering multivalued dependencies. ACM Proceedings of the 10th International Conference on Information and Knowledge Management (CIKM '01) Nov. 5-10, 2001;556-8.

Yao et al., FD_Mine: Discovering Functional Dependencies in a Database Using Equivalences. University of Regina, Department of Computer Science, Technical Report TR Apr. 2002, Aug. 2002. 17 pages.

Yao et al., FD_Mine: Discovering Functional Dependencies in a Database Using Equivalencies. Proceedings of the 2nd IEEE International Conference on Data Mining. Dec. 9-12, 2002. 4 pages.

Yao et al., Mining functional dependencies from data. Springer Science-Business Media, Data. Mining and Knowledge Discovery. Sep. 15, 2007;16(2):197-219.

Yoon et al., BitCube: A Three-Dimensional Bitmap Indexing for XML Documents. Journal of Intelligent Information Systems. 2001:241-54.

Young et al., A Fast and Stable Incremental Clustering Algorithm. 2010 Seventh International Conference on Information Technology. IEEE. 2010;204-9.

\* cited by examiner

381 Value Census

| Field | Value | Count |
|---|---|---|
| Cust. ID | 2165121 | 1 |
| Cust. ID | 7773XXX | 1 |
| ... | ... | ... |
| Country | USA | 6372 |
| Country | UK | 3009 |
| ... | ... | ... |
| Postal Code | 02210 | 13 |
| Postal Code | 02421 | 18 |
| Postal Code | 00001 | 4 |
| ... | ... | ... |

382 Validation Census

| Field | Value | Issue | Count |
|---|---|---|---|
| Cust. ID | 7773XXX | Cust. ID invalid for type | 1 |
| Postal Code | 00001 | Invalid USA zip | 4 |
| Postal Code | 02421 | Invalid UK Postal Code | 1 |
| ... | ... | ... | ... |

383 Enriched Census Data

| Field | Value | Validation Info |
|---|---|---|
| Cust. ID | 7773XXX | 1 record - invalid for type |
| Postal Code | 00001 | 4 records -- invalid USA zip |
| Country | USA | 6372 records - valid |
| Postal Code | 02421 | 17 records -- valid; 1 record -- invalid UK Postal code |
| ... | ... | ... |

FIG. 3B

481 Value Census

| Field | Value | Count |
|---|---|---|
| Cust. ID | 2165121 | 1 |
| Cust. ID | 7773XXX | 1 |
| ••• | | |
| Country | USA | 6372 |
| Country | UK | 3009 |
| Country | CA | 1622 |
| ••• | | |
| Postal Code | 02210 | 13 |
| Postal Code | 02421 | 18 |
| Postal Code | 00001 | 4 |
| Postal Code | K1A 0B1 | 11 |
| ••• | | |

482 Validation Census

| Field | Value | Issue-Count Vector | Total Count |
|---|---|---|---|
| Cust. ID | 7773XXX | [Cust. ID invalid for type, 1] | 1 |
| Postal Code | 00001 | [Invalid USA zip, 4] | 4 |
| Postal Code | 02421 | [Invalid UK Postal Code, 1] | 1 |
| Postal Code | K1A 0B1 | [Invalid UK Postal Code, 2; Invalid USA zip, 1] | 3 |
| ••• | | ••• | ••• |

483 Enriched Census Data

| Field | Value | Validation Info |
|---|---|---|
| Cust. ID | 7773XXX | 1 record – invalid for type |
| Postal Code | 00001 | 4 records – invalid USA zip |
| Country | USA | 6372 records – valid |
| Postal Code | 02421 | 17 records – valid; 1 record – invalid UK Postal code |
| Postal Code | K1A 0B1 | 8 records – valid; 2 records – invalid UK Postal code; 1 record – invalid USA zip |
| ••• | | ••• |

| Field-Value Pair Type Validity | Possible Result in Enriched Census Data | | | |
|---|---|---|---|---|
| | Valid | At Least One Invalid Instance | NULL and invalid | NULL and valid |
| Valid | ✓ | ✓ | ✗ | ✗ |
| Invalid | ✗ | ✓ | ✗ | ✗ |
| NULL | ✗ | ✗ | ✓ | ✓ |

TECHNIQUES FOR INTEGRATING VALIDATION RESULTS IN DATA PROFILING AND RELATED SYSTEMS AND METHODS

BACKGROUND

Businesses and other organizations that consume and/or produce datasets have a substantial interest in quality assurance of those datasets. Datasets can be of substantial size, often containing many thousands, or even millions of records, such that automated analysis of those datasets is the only feasible way to examine whether those records are meeting predetermined quality assurance metrics. A quality assurance analysis of a dataset often utilizes a validity specification that defines when a record of the dataset is, and is not, considered valid based on the contents of the record. In addition, statistical analyses of the values of data fields of the records, such as counts of instances of each value, can also produce valuable quality assurance information over and above the checking of validity.

As an illustration of such a process, a record format for a dataset may contain a postal code data field that is associated with a validity rule that checks whether the postal code conforms to an appropriate format (e.g., in the U.S., either five digits or five digits plus a four digit extension). Application of such a validity rule to the records of the data set may indicate how many records of the dataset contain valid or invalid U.S. postal code values. Further quality assurance information might also be obtained from statistical analysis of the postal code values, even if those values were properly formatted. A quality assurance concern might be surfaced, for example, if a large number of the postal code values unexpectedly have the same value. This distribution of postal code values might indicate a data processing error in a process that produces or modifies the postal code values.

An analysis that utilizes both the validation and statistical approaches is referred to herein as "profiling" a dataset. The collective results of such an analysis are referred to herein as a "data profile."

SUMMARY

According to some aspects, a computer-implemented method of operating a data processing system to generate a data profile based on a dataset having an associated record format defining a plurality of fields is provided, a value census for the dataset comprising a first plurality of values each having an associated field of the plurality of fields and a plurality of count values, wherein a count value indicates a number of times a respective field and value combination occurs in the at least one dataset, and a validation specification comprising a plurality of validation rules defining criteria for invalidity for one or more fields of the plurality of fields, the method comprising generating a validation census based at least in part on the dataset and the validation specification, the validation census comprising a second plurality of values each having an associated field of the plurality of fields, and a plurality of indications of invalidity, each indication of invalidity being associated with one of the second plurality of values, and generating a data profile of the at least one dataset based at least in part on the value census and the validation census, wherein generating the data profile comprises matching ones of the second plurality of values and their associated fields with ones of the first plurality of values and their associated fields, and producing a data profile for the first plurality of values of the value census at least in part by enriching ones of the first plurality of values and their associated fields with indications of invalidity of the validation census associated with matching ones of the second plurality of values and their associated fields.

According to some aspects, a computer system is provided comprising at least one processor, at least one user interface device, and at least one computer readable medium comprising processor-executable instructions that, when executed, cause the at least one processor to perform a method of generating a data profile based on a dataset having an associated record format defining a plurality of fields, a value census for the dataset comprising a first plurality of values each having an associated field of the plurality of fields and a plurality of count values, wherein a count value indicates a number of times a respective field and value combination occurs in the at least one dataset, and a validation specification comprising a plurality of validation rules defining criteria for invalidity for one or more fields of the plurality of fields, the method comprising generating, based at least in part on the dataset and the validation specification, a validation census comprising a second plurality of values each having an associated field of the plurality of fields, and a plurality of indications of invalidity, each indication of invalidity being associated with one of the second plurality of values, and generating, based at least in part on the value census and the validation census, a data profile of the at least one dataset by matching ones of the second plurality of values and their associated fields with ones of the first plurality of values and their associated fields, and producing a data profile for the first plurality of values of the value census at least in part by enriching ones of the first plurality of values and their associated fields with indications of invalidity of the validation census associated with matching ones of the second plurality of values and their associated fields.

According to some aspects, a computer system for generating a data profile based on a dataset having an associated record format defining a plurality of fields is provided, a value census for the dataset comprising a first plurality of values each having an associated field of the plurality of fields and a plurality of count values, wherein a count value indicates a number of times a respective field and value combination occurs in the at least one dataset, and a validation specification comprising a plurality of validation rules defining criteria for invalidity for one or more fields of the plurality of fields, comprising at least one processor, means for generating, based at least in part on the dataset and the validation specification, a validation census comprising a second plurality of values each having an associated field of the plurality of fields, and a plurality of indications of invalidity, each indication of invalidity being associated with one of the second plurality of values, and means for generating, based at least in part on the value census and the validation census, a data profile of the at least one dataset by matching ones of the second plurality of values and their associated fields with ones of the first plurality of values and their associated fields, and producing a data profile for the first plurality of values of the value census at least in part by enriching ones of the first plurality of values and their associated fields with indications of invalidity of the validation census associated with matching ones of the second plurality of values and their associated fields.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIG. 3B is a flowchart depicting illustrative data in the process of FIG. 3A, according to some embodiments;

FIG. 4B is a flowchart depicting illustrative data in the process of FIG. 4A, according to some embodiments;

FIG. 5D illustrates a truth table according to type validity of a field-value pair, according to some embodiments.

DETAILED DESCRIPTION

Figure 1:
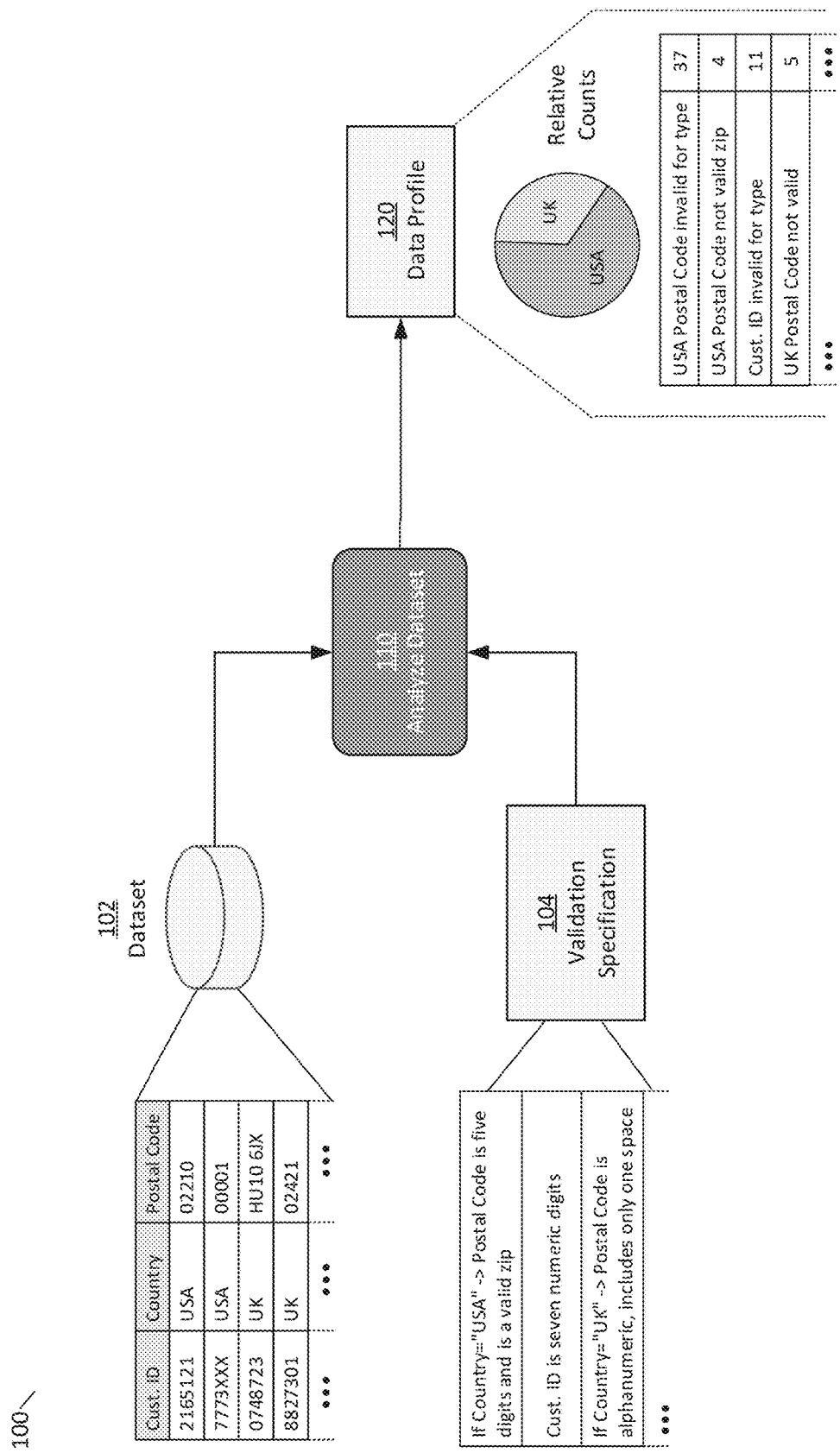
FIG. 1 is a flowchart depicting a process of profiling a dataset, according to some embodiments.

As discussed above, generating a "data profile" may include any analysis on data that generates both validity (e.g., which records are valid or invalid) and statistical (e.g., counts of values, mean values, etc.) information. In a conventional data profiling process, records of a dataset are examined one at a time. For each record, a validity specification is used to check data fields of each record to determine whether any data fields contain invalid data according to the specification, and if so, which ones and for what reason. In addition, information on the various values that appear in each field are retained so that statistics on the values of each field may be produced at the end of the process. Such a process is, however, inflexible in that both validity checking and statistical processing of the dataset occur in tandem, leading to substantial processing in a single operation. Moreover, an entire dataset must be profiled as a unit in order to produce the desired invalidity and statistical information. This process can be very computationally intensive for large datasets, such that a large processing operation is necessary to produce a desired data profile of the dataset. An illustrative example of this approach is shown in FIG. 1, discussed further below.

The inventors have recognized and appreciated that profiling of a dataset can be broken up into multiple stages. Firstly, a "value census" can be produced from the dataset that summarizes how frequently values occur in each data field of the dataset, thereby producing a list of field-value pairs with associated count values. Secondly, and separately, a "validation census" can be produced from the dataset that identifies invalid fields for records of the dataset. The data from each census are then combined by "enriching" the value census data with any indications of invalidity that are associated with the field-value pairs of the value census in the validation census. An advantage of this approach is that a process that generates the value census need not utilize the same software that generates the validation census or that enriches the value census using the validation census. Indeed, this technique allows the value census to be generated in any location and using any suitable software, greatly increasing the flexibility afforded to a data profiling process.

This multi-stage approach accordingly produces two sets of distinct data—the value census and the validation census—that each do not generally provide a complete data profile of a dataset. For instance, it is possible for a particular value of a data field to be sometimes valid yet also sometimes invalid, because the validity specification for that data field may depend on the values of one or more other data fields. For at least this reason, a complete understanding of the data cannot generally be gained purely from statistics on the data field values represented by the value census, because a count of a number of instances of a data field value provides no information on its validity. Nor can the validation census fully convey quality on its own because it indicates only instances of invalidity or validity, and does not comprise any statistics with regard to the data values.

As a non-limiting example, a validation specification to be applied may indicate that a postal code data field is invalid when a country data field is equal to "US" and the postal code does not contain five numeric digits (in this example, other country data field values could have different, additional validity rules for the postal code data field). A value census of a dataset may indicate that a particular postal code of "02144" appears 100 times in the dataset, but this alone does not indicate which of these 100 values might be valid and which might be invalid, because the value census does not determine which respective country values correspond to these 100 values. Indeed, to perform this kind of analysis would involve the checking of validity; something the value census is intended to avoid in the described multi-step process. Similarly, the validation census would indicate, for each of the records containing the "02144" postal code value, which records are valid and which are invalid. It is true that the validation census could be analyzed to determine how many times the "02144" postal code appears in the validation census, but again this would replicate the processing required to produce the value census and it is this type of combined processing that the described multi-step process is intended to avoid.

Enriching the value census with the validation census presents a challenge, however, because the contents of the validation census do not readily have a one-to-one mapping with the contents of the value census. Since the value census indicates only the counts of data fields and their respective values, there is no way to discern from the value census which records contributed to which field-value counts. The validation census, on the other hand, produces indications of invalidity associated with particular records of the data. Yet, corresponding entries of the validation census need to identified for a given entry in the value census before the value census entry can be enriched.

The inventors have recognized and appreciated techniques for combining a value census and a validation census by matching field-value pairs from each census. Results of applying a validation specification to a dataset may be processed to "roll up" indications of invalidity for records to produce counts of invalid field-value pairs, allowing the field-value pairs of the value census to be enriched with matching field-value pairs in the validation census. In some cases, a count of a given field-value pair in the value census may not match the corresponding count of the same field-value pair in the validation census; this occurs when only some, but not all, instances of that field and value combination are invalid. In such cases, the process that combines the census data can interpret the censuses to produce an appropriate output.

According to some embodiments, application of a validation specification to a dataset by a data processing system may produce indications of invalidity that are associated with particular records of the dataset. For instance, a data processing system may receive the dataset and validation specification as inputs and may produce data that contains records of the dataset in addition to data for each record that specifies whether any data fields of the record were found to be invalid, and for what reason(s). While such a result may conventionally be a helpful indication of validity, as discussed above, an output of this form cannot be easily used to enrich a value census. As such, according to some embodiments, production of a validation census may aggregate indications of validity that are associated with respective records of the dataset to produce indications of invalidity associated with respective field-value pairs.

According to some embodiments, a data processing system that aggregates indications of validity associated with respective records of the dataset may "roll up" those indications such that a list of indications of invalidity is produced for each field-value combination. That is, aggregation may produce, for each record in the dataset, a record in the validation census containing a field-value pair from the dataset record along with an indication of why that field-value pair was found to be invalid. A roll up operation may perform additional aggregation on such data so that each unique field-value pair appears once in the validation census and which each have an associated list of reasons for invalidity. In some embodiments, a count value for each instance of invalidity may also be produced in the validation census for an associated field-value pair.

According to some embodiments, a value census may include an indication of type validity of each field-value pair present in a dataset. A data processing system may produce the value census by accessing a record format describing the dataset and collate instances of each value of each data field of the record format. As such, the data processing system may additionally check whether such values conform to the expected type as defined by the record format. For instance, a record format including a telephone number data field may have a numeric type. Whilst collating the number of instances of each value of this field to produce the value census, the data processing system may additionally determine, for each of these values, whether the value conforms to the expected numeric type. The value census may accordingly include an indication of whether each of the included field-value pairs is valid or invalid for type.

According to some embodiments, a value census may include an indication of nullity for each field-value pair. In some cases, a record format describing a dataset may indicate, for one or more fields of the record, whether particular values of that field are to be interpreted as null values. Whilst empty field values are commonly defined to be interpreted as null, in general any suitable field value can be defined to be null. In some embodiments, a data processing system generating a value census from a dataset may additionally check whether such values are those defined to be null as per the record format. For instance, a record format including a name field may be defined to be a string field that is null when empty. Whilst collating the number of instances of each value of this field to produce the value census, the data processing system may additionally determine, for each of these values, whether the value is empty, and therefore considered to be null. The value census may accordingly include an indication of whether each of the included field-value pairs is or is not null. An indication of nullity may be generated for a value census independently of whether an indication of type validity is also generated. That is, either or both indications may be generated for a value census.

Following below are more detailed descriptions of various concepts related to, and embodiments of, techniques for integrating validation results in data profiling. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 is a flowchart depicting a process of profiling a dataset, according to some embodiments. Process 100 illustrates a conventional data profiling process in which a data processing system analyses a dataset 102 based in part on a validation specification 104 and produces a data profile 120 based on this analysis. As discussed above, a data profile refers herein to data that describes both validity and statistics of a dataset, and may be presented by a user interface of the data processing system in any of various ways, including via charts, graphs, lists or combinations thereof, some examples of which are shown in FIG. 1.

As shown in the illustrative example of FIG. 1, the dataset 102 has an associated record format that defines three data fields (referred to hereafter simply as "fields"): a customer ID, a country and a postal code. The validation specification defines a number of validation rules against which records and field values of the dataset may be checked to determine whether any of the records are invalid, and for what reasons. A validation specification may take various forms, such as rules defined in a spreadsheet or other software designed to allow entry of validity rules for a given record format, and/or code that embodies a set of validation rules by examining input values and producing output indicative of the validity of those values.

In the example of FIG. 1, a first validation rule indicates that, for a record to be valid when the value of the Country field is "USA," a postal code must contain five digits and be a valid US zip code. Validity of the postal code as a valid zip could be established by checking the postal code against a list of valid zip codes, for example. In the illustrative data profiling process of FIG. 1, each of the records in dataset 102 is examined to see whether it conforms to this validation rule, or not, in analysis step 110. That is, the data processing system executing process 100, evaluates an expression upon the relevant fields of each record (in this example, Country and Postal Code) and a result of that evaluation indicates whether or not the record is valid or not. An indication of validity or invalidity, which may for instance include any invalid values, may be output from step 110 to produce data profile 120.

In process 100, each of the rules of the validation specification 104 may be checked against the records of the dataset 102 in step 110. Furthermore, the data processing system, when executing step 110, may count how many times each field contains each unique value found in dataset 102. The system may then collate these statistics to produce the data profile 120. In view of the above process, for each record when executing step 110, the data processing system evaluates all of the validation rules in validation specification 104 against the record and updates running totals of the unique instances of each value of each field in the dataset 102. As discussed above, executing all of these actions for each record of a dataset can occupy a significant amount of time and may require significant processing power to complete, especially when the dataset contains many fields and many records. Breaking up the process into the production of a value census and a validation census by a data processing system can provide greater flexibility in how and where this processing takes place, since the production of a data profile need not be a single, monolithic process but can take place in multiple locations by multiple different computing systems, and even with multiple different types of software.

According to some embodiments, data profile 120 may include statistics regarding absolute or relative occurrences of unique values of one or more of the fields of dataset 102 in addition to a list of occurrences of invalid field values. Portions of such data is represented in FIG. 1 as merely one example. The data profile may represent this data in any suitable manner such that a data processing system or other system can present aspects of the data profile to a user via a user interface comprising charts, tables, etc.

Figure 2A:
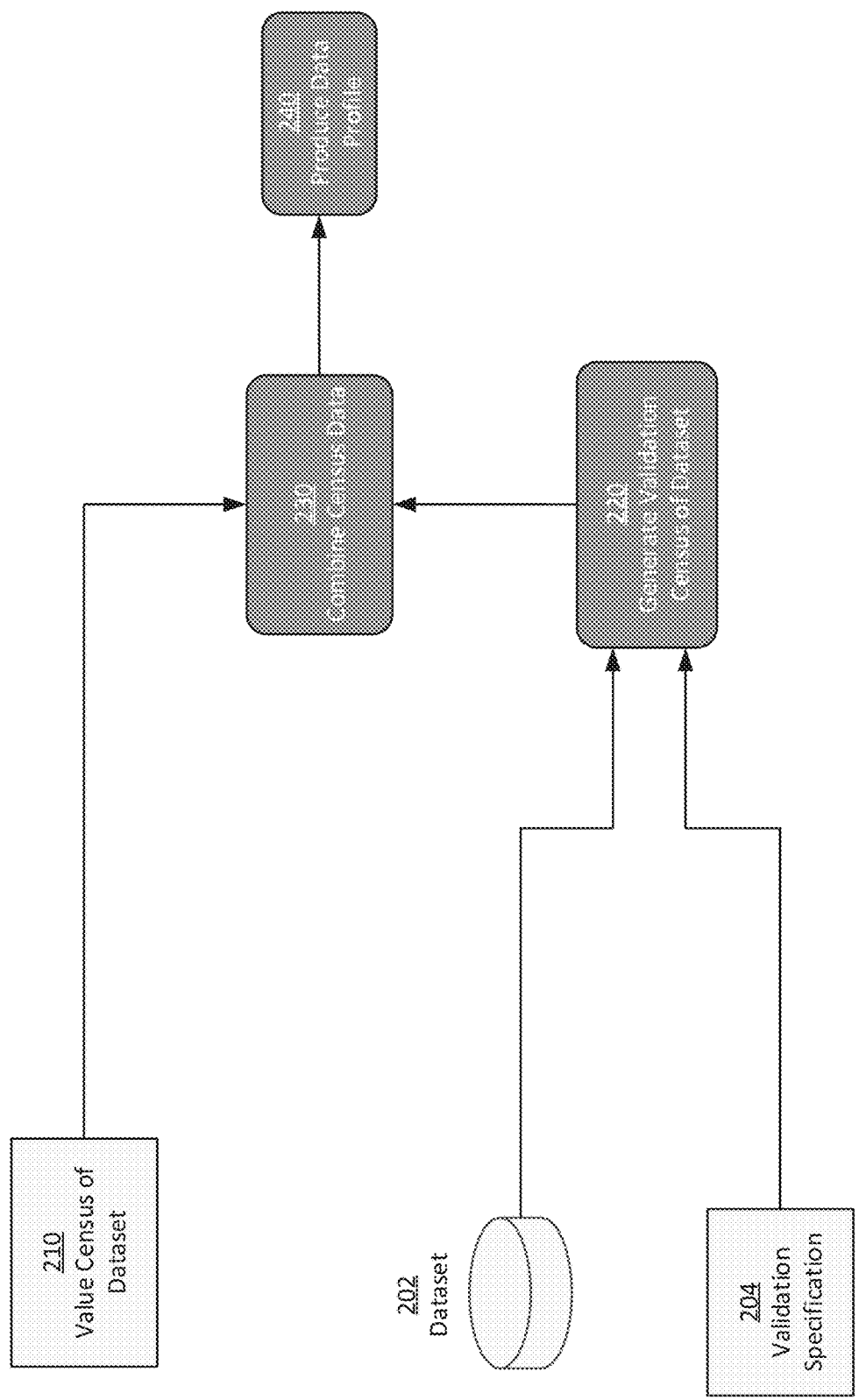
FIG. 2A is a flowchart depicting a process of enriching a value census by combining data of the value census with that of a validation census, according to some embodiments.

FIG. 2A is a flowchart depicting a process of enriching a value census by combining data of the value census with that of a validation census, according to some embodiments. In the example of FIG. 2A, a data processing system may execute process 200, in which a dataset 202 is checked against a validation specification 204 to produce indications of invalidity in step 220. Separately and independently, a value census of the dataset 210 is input to the process. The value census and validation census are then combined by enriching the value census data with the indications of invalidity in step 230. The data processing system may then produce a data profile 240 based on the combined census data. As discussed above, enrichment of a value census with a validation census may be performed by a data processing system by matching field-value pairs between the two censuses, examples of which are discussed further below.

The value census 210 may have been produced by the same data processing system executing process 200, or may have been produced by a different data processing system. Indeed, the flexibility of the approach described herein, and of which an illustrative example is depicted by FIG. 2A, provides that the value census 210 may be produced by any suitable system in any suitable manner, including by software applications that differ from those implemented by the data processing system executing process 200.

Figure 2B:
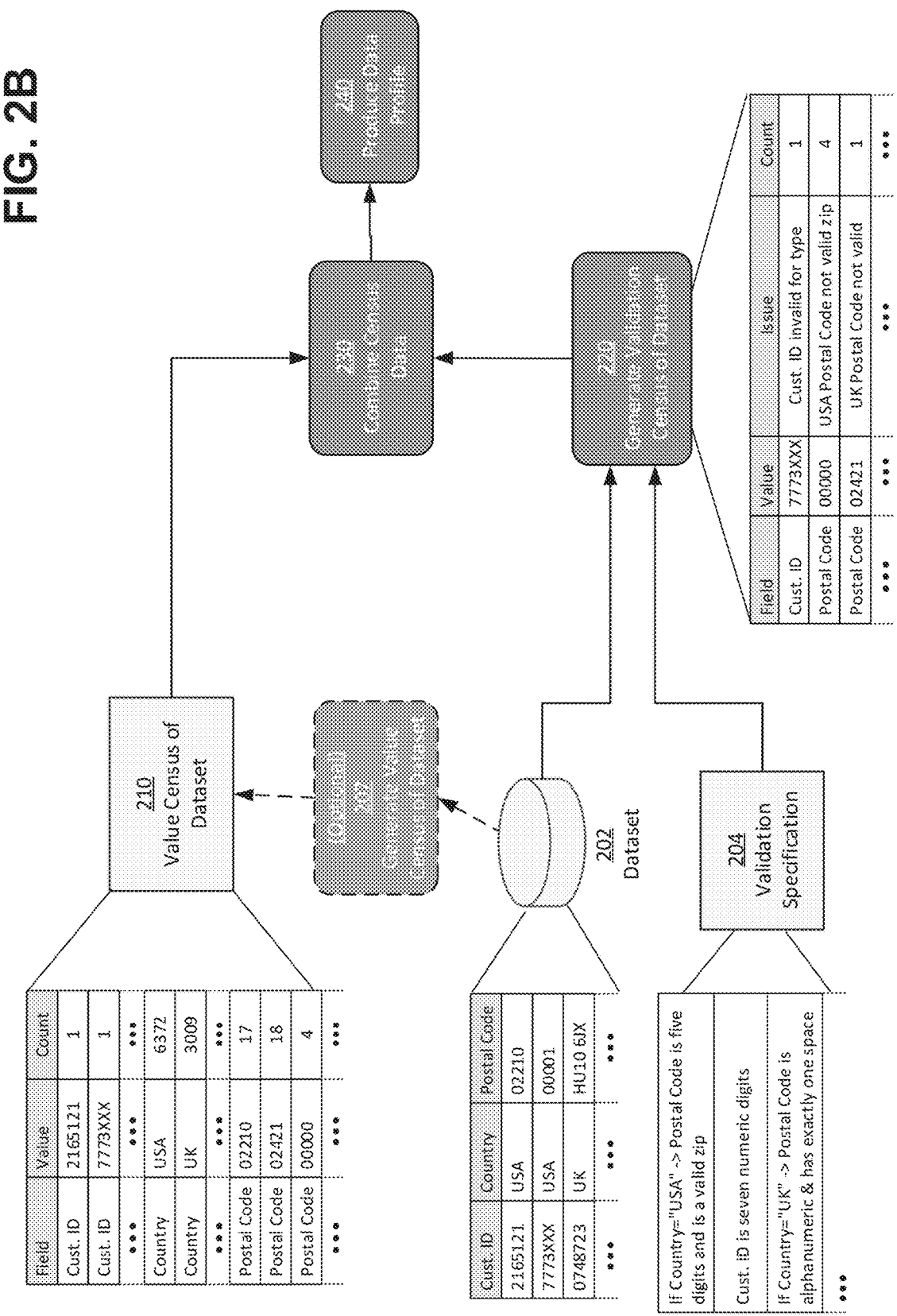
FIG. 2B depicts illustrative data in the process of FIG. 2A, according to some embodiments.

FIG. 2B depicts an illustrative instance of the process of FIG. 2A, according to some embodiments. To illustrate one example of data that might be processed within the process 200 of FIG. 2A, FIG. 2B depicts process 201 in which a particular exemplary dataset is to be analyzed. The dataset 202 includes three fields: a customer identification number ("Cust. ID"), a country and a postal code. For clarity, a few sample records are shown in FIG. 2B although it will be appreciated that dataset 202 may include many such records.

In the example of FIG. 2B, a value census of the dataset 210 is provided as input to process 230, which combines the value census 210 with a generated validation census. The value census of dataset 202 may be received from a different process, as described above, or may optionally be generated in process 201 from the dataset 202. The value census 210 comprises a count associated with field value pairs present in the dataset 202. For instance, the value 2165121 for the field customer ID, which is present in the first record shown in FIG. 2B, is present only once in the entire dataset as indicated by the count of 1 for this field and value pair in the value census. As another example, the value "USA" for the country field, which is present in the first and second records of the depicted data in FIG. 2B, is present 6372 times in the dataset 202 according to the value census.

In the example of FIG. 2B, the validation specification includes at least three illustrative validation rules, which refer to the postal code field and the customer ID field. One of the two rules relating to the postal code field in this example is applied to a record according to the value of the country field in the record (whether the country is "USA" or "UK"). Each of the validation rules is applied to each record of the dataset 202 by the data processing system, as described above, to generate the validation census in step 220. For example, when the data processing system evaluates the validation specification against the second record of the illustrated data in step 220 of FIG. 2B, the value of the country field is "USA"; therefore the first validation rule triggers a check of whether the postal code of the record is five digits and whether the value is a valid US zip code. In this case, the value is five digits, but has a value "00000," which is an invalid US zip code. As a result, the data processing system in step 220 generates a record of the validation census that identifies the postal code field, the associated value of "00000" and a description of the validity issue—that the USA postal code was found to not be a valid zip. As shown in the example of FIG. 2B, this particular field-value pair was found to be invalid for this reason four times. Subsequent to the data processing system generating the validation census, the system may combine this census with the value census in step 230. The process of combining the censuses is described in further detail below.

Figure 2C:
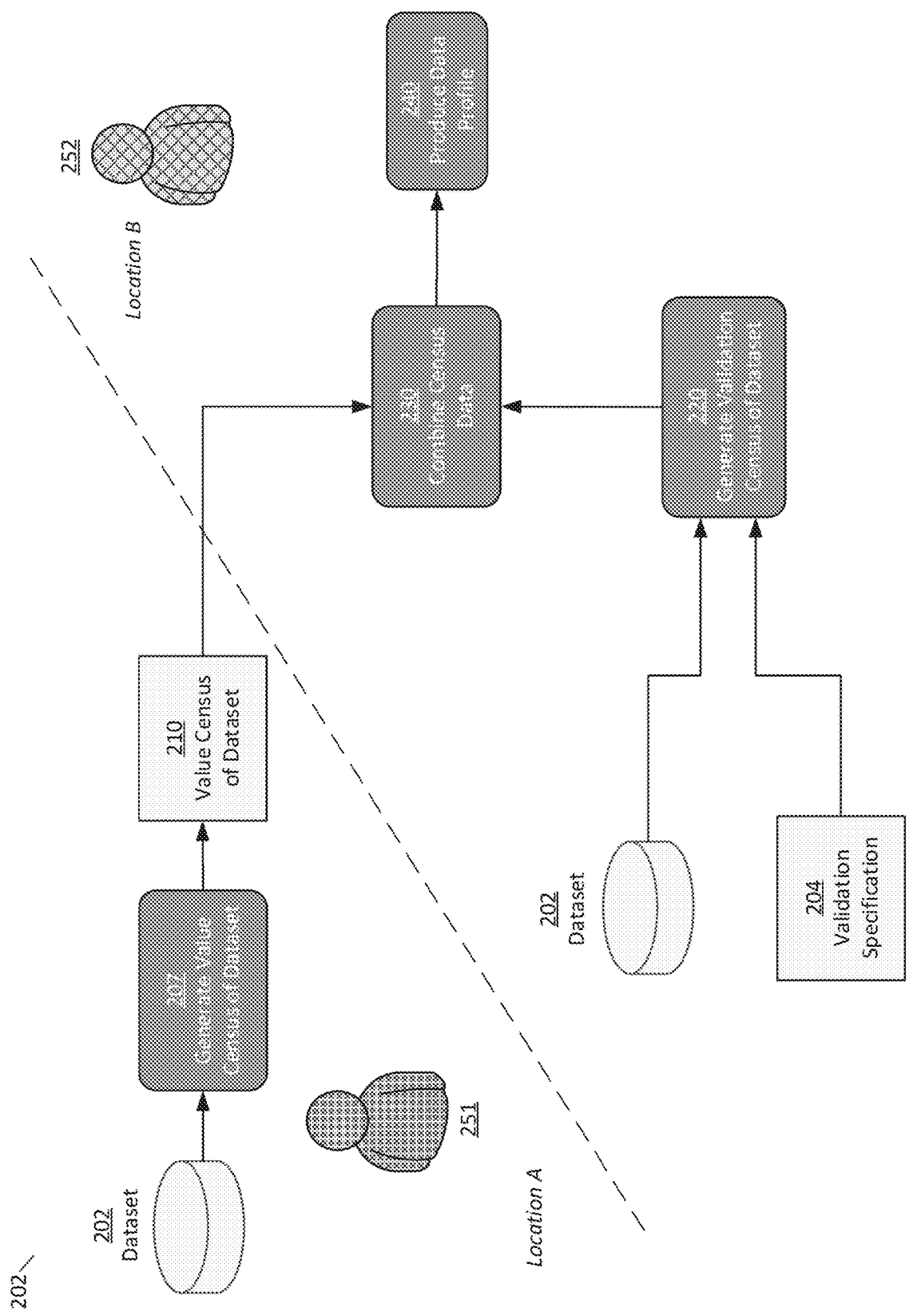
FIG. 2C depicts a use case in which different users and/or processes create the value census and enrich the value census in the process of FIG. 2A, according to some embodiments.

To aid in illustration of the flexibility of the process shown in FIG. 2A, FIG. 2C depicts a sample use case of FIG. 2A in which different users and/or processes create the value census and enrich the value census in the process of FIG. 2A. As discussed above, a data processing system that combines a value census with a validation census need not be the same data processing system that produced the value census. FIG. 2C illustrates an example of this scenario where a user 251, operating a first data processing system in location A, operates the system to produce a value census 210 from a dataset 202 through process 207. A different user 251, operating a second data processing system in location B, operates that system to produce a validation specification from the same dataset 202, to receive the value census from location A, and to combine the census data by enriching the value census in step 230. The data profile 240 may then be produced from the enriched census data.

Figure 2D:
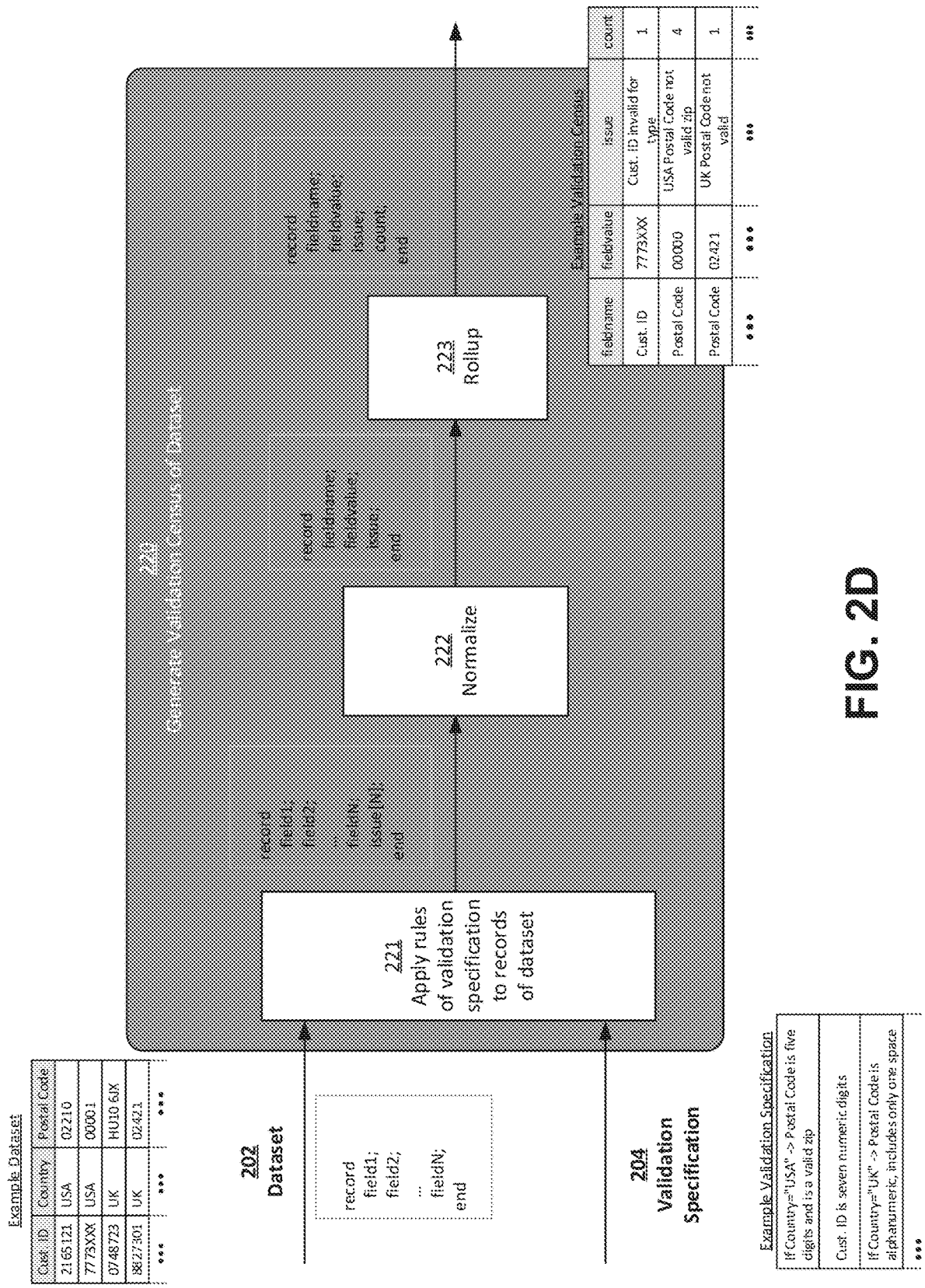
FIG. 2D depicts an illustrative process for generating a validation census in a form suitable for combination with a value census, according to some embodiments.

FIG. 2D depicts an illustrative process for generating a validation census in a form suitable for combination with a value census, according to some embodiments. As discussed above, for a data processing system to combine a validation census with a value census, the validation census and value census may each comprise a list of unique field-value pairs so that the field-value pairs can be matched and the respective information—counts in the value census and issues in the validation census—can be combined. FIG. 2D depicts an illustrative example of how step 220 of FIG. 2A may be configured to produce a validation census in this form. Example input and output data to process 220 are shown in FIG. 2D in accordance with the example of FIG. 2B for purposes of illustration.

In the example of FIG. 2D, the data processing system executing step 220 obtains a dataset 202 and a validation specification 204 as input. The dataset 202 comprises a number of records that each comprise N data fields. Throughout the example of FIG. 2D, for purposes of illustration, a record format describing the data at each stage in the process is denoted by a listing of fields within a "record . . . end" container. For instance, the dataset 202 contains records that comprise fields named field1, field2, . . . , fieldN.

In step 221 of FIG. 2D, rules of the validation specification 204 may be applied to the dataset 202 to produce indications of invalidity. The data processing system may evaluate each of these validation rules for each incoming record of the dataset 202, thereby producing records containing the data of the evaluated record in addition to a vector of issues identified by the validation rules, "issue[N] ". It will be appreciated that the length of this vector may be zero (i.e., it may be empty) for records that contain valid data according to the validation specification. The elements of the vector "issue[N]" may each identify a validation issue as generated by application of the validation spec by the data processing system in step 221.

In step 222 of FIG. 2D, a normalize operation is performed by the data processing system on the data output by step 221, which produces, for each incoming record, a number of records equal to the length of the vector "issue [N]". Accordingly, for records that contained no issues (i.e., are valid according to the validation specification 204), step 222 outputs no records. The data output by step 222 indicates, for each issue present in the data output from step 221, the name of a corresponding field that produced the identified issue "fieldname," and the value of that field that produced the identified issue "fieldvalue," in addition to an indication of the issue itself. Thus, the data processing system when executing step 222 produces a record for each validity issue found in step 221.

In step 223 of FIG. 2D, a rollup operation is performed by the data processing system on the data output by step 222 using the combination of fieldname and fieldvalue and issue as a key. This operation "rolls up" all of the records having the same combination of fieldname, fieldvalue and issue into a single record, which also includes a count of how many times that combination occurred in the data. Accordingly, the output of step 223 comprises each unique combination of fieldname, fieldvalue and issue along with an instance count of that combination.

It will be appreciated that there may be many different ways in which a data processing system may check records of a dataset against a validation specification and produce a list of validation issues associated with field-value pairs of the dataset, and accordingly that FIG. 2D is provided as but one illustrative example.

Figure 3A:
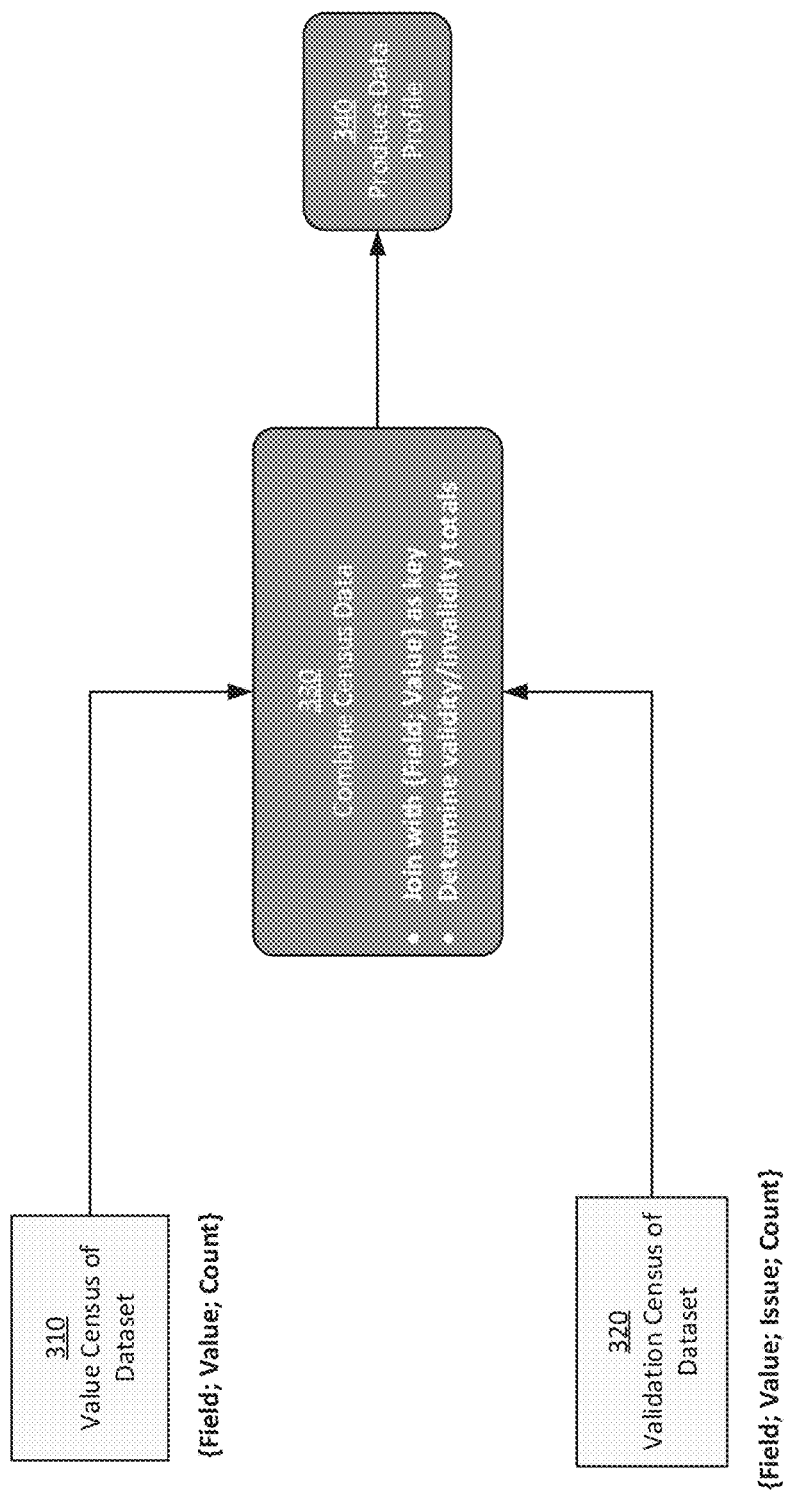
FIG. 3A is a flowchart depicting a first technique of enriching a value census by combining data of the value census with that of a validation census, according to some embodiments.

FIG. 3A is a flowchart depicting a first technique of enriching a value census by combining data of the value census with that of a validation census, according to some embodiments. Process 300 illustrates a process executed by a data processing system in which census data is combined to produce data from which a data profile may be generated. As discussed above, the value census of a dataset may indicate counts of field-value pairs whereas a validation census may be configured (e.g., via the process of FIG. 2D) to indicate counts of validation issues for field-value pairs of the dataset.

In the example of FIG. 3A, the value census 310 is joined with the validation census 320 in step 330 using the combination of field and value fields of the respective censuses as a join key. That is, for each of the records of the value census (which in the example of FIG. 3A each comprise the name of a field, a corresponding value of that field, and a count of the instances of the field-value pair present in the database), any records in the validation census that have a matching field name and field value are used to enrich the value census. The result of such a combination is to produce, for each field-value pair in the original dataset, a count of that field-value pair's occurrence in addition to a list of any validation issues that were found for that field-value pair. A data profile may be produced in step 340 based upon the enriched census data produced by step 330.

FIG. 3B depicts an illustrative instance of step 330 in the process of FIG. 3A, according to some embodiments. To illustrate one example of data that might be processed within the process 330 of FIG. 3A, FIG. 3B depicts process 302 in which illustrative value and validation censuses are combined. In the example of FIG. 3B, illustrative value census 381 has been generated for a dataset defined according to a record format having three fields: a customer identification number ("Cust. ID"), a country and a postal code. Counts for some illustrative field-value pairs are shown in FIG. 3B. In addition, an illustrative validation census 382 has been generated and indicates invalidity counts and invalidity issues for several field-value pairs of the dataset. Step 330 produces enriched census data 383 based on the inputs 381 and 382 that indicates, for the field-value pairs of the value census, which records were valid and invalid, and for what reasons invalidity was determined when an invalid instance was identified.

For example, the Cust. ID value of 7773XXX appears once in the dataset as shown by the count of that field and value pair in the value census 381. In addition, the same field-value pair appears in the validation census with the same count and an identified reason for invalidity ("invalid for type"). The resulting enriched census data 383 includes a summary of this instance of the field-value pair. As another example, the postal code value of 02421 occurs 18 times in the dataset as shown by the value census 381. This field-value pair appears in the validation census as an "Invalid UK Postal Code" with a count of 1. When enriching the value census with this validation census data, therefore, it is inferred that there are 17 valid instances of the postal code-02421 field-value pair and one invalid instance, as summarized in the enriched census data 383.

Figure 3C:
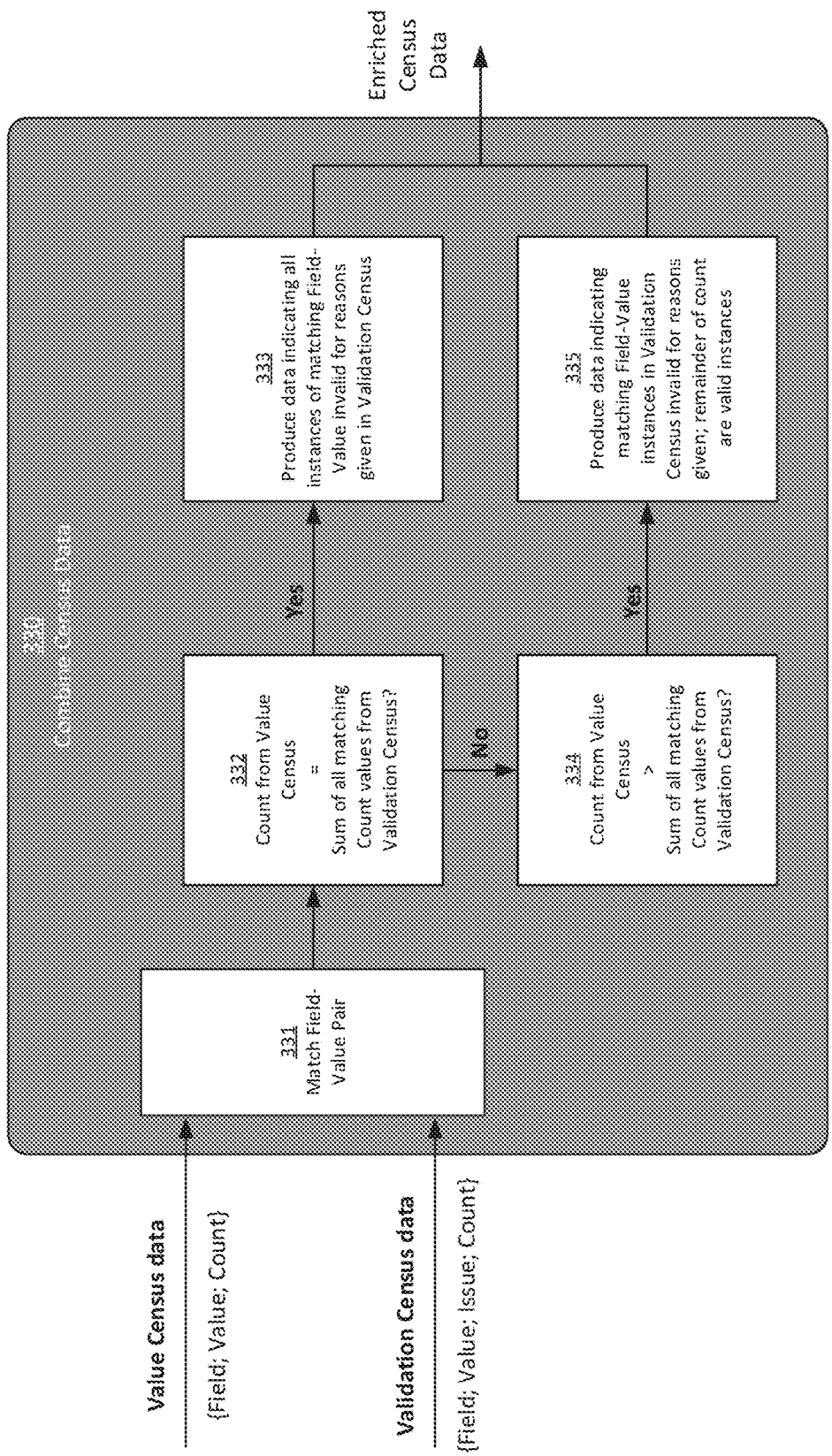
FIG. 3C is a flowchart depicting enrichment of the value census according to the first technique of FIG. 3A, according to some embodiments.

FIG. 3C depicts an illustrative approach to implementing step 330 of FIG. 3A. In the example of FIG. 3C, field-value pairs of the value census and validation census are matched in step 331. Due to the manner in which the value census and validation census have been prepared in the example of FIG. 3A, each unique combination of field and value appears no more than once in the value census, yet the same combination of field and value may appear multiple times in the validation census in cases where the same field and value pair produced multiple different invalidity issues. In some cases, a field-value pair may appear in the value census yet not appear in the validation census, indicating that every instance of this field-value pair was found to be valid. In other cases, a field-value pair may appear both in the value census and the validation census, indicating that at least some of the instances of the field-value pair were invalid.

In some embodiments, step 331 may be implemented as a join operation by the data processing system executing step 330. That is, the union of records in the value census and validation census may be produced using the combination of field and value as a join key. The resulting data may include, for each field-value pair in the value census, an indication of any issues and their counts that occurred with respect to that field-value pair in addition to a count of the number of times the pair appeared in the dataset.

Irrespective of how the field-value pairs are matched in step 331, in step 332 each field-value pair appearing in the value census is examined to determine whether its count value in the value census is equal to the total of the count values from amongst all matching field-value pairs in the validation census. If the counts match, this indicates that all of the instances of the field-value pair were invalid in the dataset. Accordingly, in this case data is produced in step 333 that indicates all instances of this field-value pair were found invalid. In the example of FIG. 3C, data is also produced indicating for respective field-value pairs the reasons why those records were found to be invalid.

Alternatively, in step 334 a field-value pair appearing in the value census may have a count value that is greater than the total of the count values from amongst all matching field-value pairs in the validation census. This indicates that less than all of the instances of the field-value pair were found by the data processing system to be invalid. In step 334, the data processing system determines the number of valid instances of the field-value pair by subtracting the sum of all matching count values in the validation census from the count from the value census. In some cases, where the sum of all matching count value from the validation census is zero, this indicates that all of the instances of the field-value pair were found to be valid. Alternatively, only a portion of the instances of the field-value pair may have been found to be valid. In act 335, data is produced that indicates that some instances of the field-value pair were found valid and, in some cases, that also indicates that some instances of the field-value pair were found invalid. In the example of FIG. 3B, where invalid instances are identified in act 335, data is also produced indicating for respective field-value pairs the reasons why those records were found to be invalid.

It will be appreciated that, in some embodiments, it may not be necessary to perform the logical evaluation of act 334 because the sum of all matching count values from the validation census cannot exceed the count from the value census for a given field-value pair. As such, the logical evaluation of act 334 may be redundant once the logical evaluation of act 332 has been determined and found to be false. Accordingly, a data processing system may execute step 335 directly after evaluating step 332.

Figure 4A:
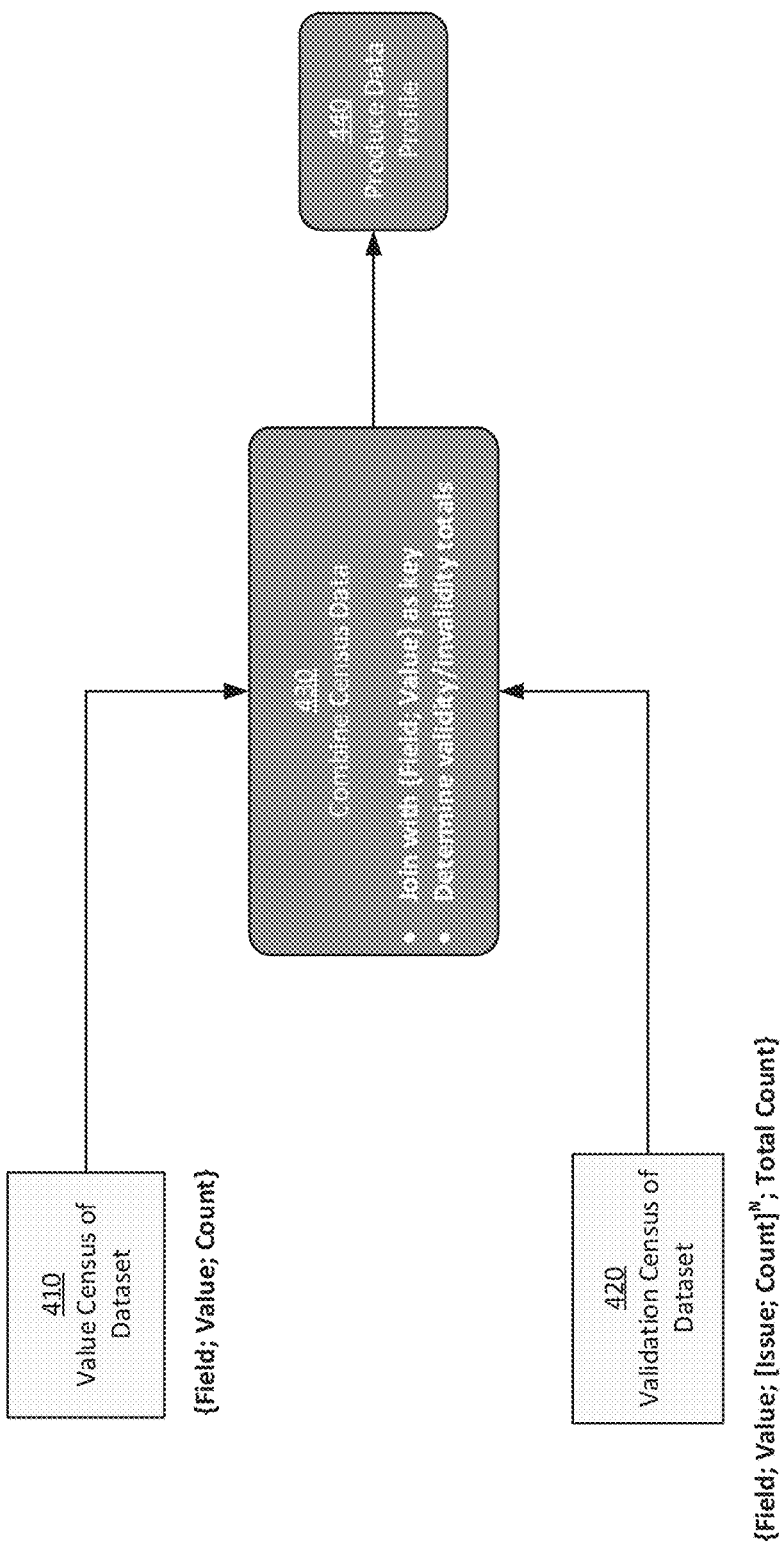
FIG. 4A is a flowchart depicting a second technique of enriching a value census by combining data of the value census with that of a validation census, according to some embodiments.

FIG. 4A is a flowchart depicting a second technique of enriching a value census by combining data of the value census with that of a validation census, according to some embodiments. Process 400 illustrates a process executed by a data processing system in which census data is combined to produce data from which a data profile may be generated. As discussed above, the value census of a dataset may indicate counts of field-value pairs whereas a validation census may be configured (e.g., via the process of FIG. 2D) to indicate counts of validation issues for field-value pairs of the dataset.

In the example of FIG. 4A, the value census 410 is joined with the validation census 420 in step 430 using the combination of field and value fields of the respective censuses as a join key. That is, for each of the records of the value census (which in the example of FIG. 4A each comprise the name of a field, a corresponding value of that field, and a count of the instances of the field-value pair present in the database), any records in the validation census that have a matching field name and field value are used to enrich the value census. The result of such a combination is to produce, for each field-value pair in the original dataset, a count of that field-value pair's occurrence in addition to a list of any validation issues that were found for that field-value pair. A data profile may be produced in step 440 based upon the enriched census data produced by step 430.

In contrast to FIG. 3A, in the example of FIG. 4A, the validation census has been configured so that a vector of invalidity issues and respective counts is associated with each field-value pair appearing tin the validation census. Unlike in the example of FIG. 3A, therefore, each field-value pair of the validation census appears only once, multiple instances having been "denormalized" into a vector within a single record. The length of this vector therefore is equal to the number of different invalidity reasons identified for the associated field-value pair.

FIG. 4B depicts an illustrative instance of the process of FIG. 4A, according to some embodiments. To illustrate one example of data that might be processed within the process 430 of FIG. 4A, FIG. 4B depicts process 402 in which illustrative value and validation censuses are combined. In the example of FIG. 4B, illustrative value census 481 has been generated for a dataset defined according to a record format having three fields: a customer identification number ("Cust. ID"), a country and a postal code. Counts for some illustrative field-value pairs are shown in FIG. 4B. In addition, an illustrative validation census 482 has been generated and indicates invalidity counts and invalidity issues for several field-value pairs of the dataset. Step 430 produces enriched census data 483 based on the inputs 481 and 482 that indicates, for the field-value pairs of the value census, which records were valid and invalid, and for what reasons invalidity was determined when an invalid instance was identified.

Figure 4C:
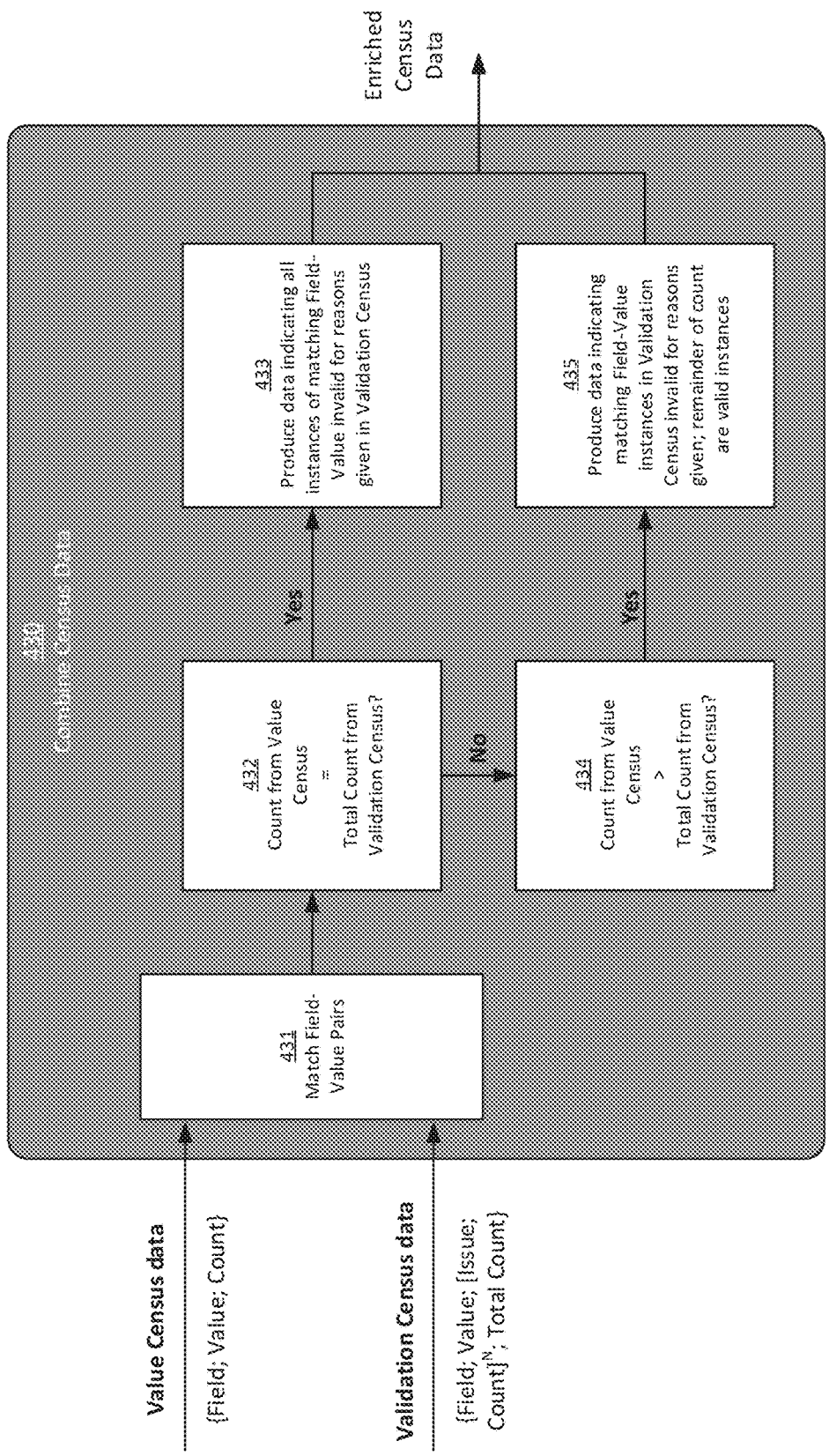
FIG. 4C is a flowchart depicting enrichment of the value census according to the second technique of FIG. 4A, according to some embodiments.

FIG. 4C depicts an illustrative approach to implementing step 430 of FIG. 4A. In the example of FIG. 4C, field-value pairs of the value census and validation census are matched in step 431. Due to the manner in which the value census and validation census have been prepared in the example of FIG. 4A, each unique combination of field and value appears no more than once in either the value census or the validation census. In some cases, a field-value pair may appear in the value census yet not appear in the validation census, indicating that every instance of this field-value pair was found to be valid. In other cases, a field-value pair may appear both in the value census and the validation census, indicating that at least some of the instances of the field-value pair were invalid.

In some embodiments, step 431 may be implemented as a join operation by the data processing system executing step 430. That is, the union of records in the value census and validation census may be produced using the combination of field and value as a join key. The resulting data may include, for each field-value pair in the value census, an indication of any issues and their counts that occurred with respect to that field-value pair (e.g., as per the vector format of the validation census 420) in addition to a count of the number of times the pair appeared in the dataset.

Irrespective of how the field-value pairs are matched in step 431, in step 432 each field-value pair appearing in the value census is examined to determine whether its count value in the value census is equal to the total of the count values from amongst all matching field-value pairs in the validation census. If the counts match, this indicates that all of the instances of the field-value pair were invalid in the dataset. Accordingly, in this case data is produced in step 433 that indicates all instances of this field-value pair were found invalid. In the example of FIG. 4C, data is also produced indicating for respective field-value pairs the reasons why those records were found to be invalid.

Alternatively, in step 434 a field-value pair appearing in the value census may have a count value that is greater than the total of the count values from amongst all matching field-value pairs in the validation census. This indicates that less than all of the instances of the field-value pair were found by the data processing system to be invalid. In step 434, the data processing system determines the number of valid instances of the field-value pair by subtracting the sum of all matching count values in the validation census from the count from the value census. In some cases, where the sum of all matching count value from the validation census is zero, this indicates that all of the instances of the field-value pair were found to be valid. Alternatively, only a portion of the instances of the field-value pair may have been found to be valid. In act 435, data is produced that indicates that some instances of the field-value pair were found valid and, in some cases, that also indicates that some instances of the field-value pair were found invalid. In the example of FIG. 4C, where invalid instances are identified in act 435, data is also produced indicating for respective field-value pairs the reasons why those records were found to be invalid.

It will be appreciated that, in some embodiments, it may not be necessary to perform the logical evaluation of act 434 because the sum of all matching count values from the validation census cannot exceed the count from the value census for a given field-value pair. As such, the logical evaluation of act 434 may be redundant once the logical evaluation of act 432 has been determined and found to be false. Accordingly, a data processing system may execute step 435 directly after evaluating step 432.

Figure 5A:
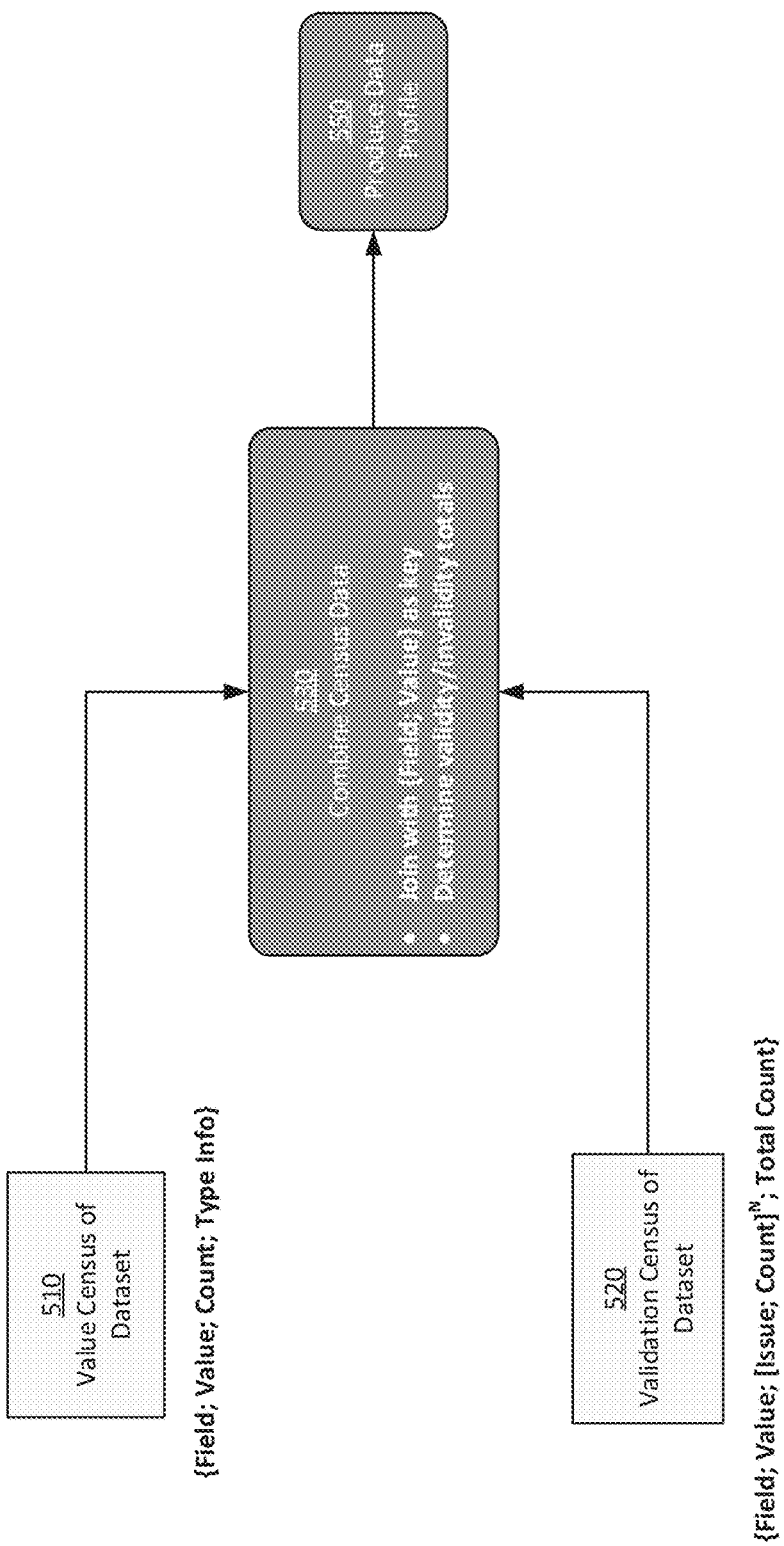
FIG. 5A is a flowchart depicting a third technique of enriching a value census by combining data of the value census with that of a validation census, according to some embodiments.

FIG. 5A is a flowchart depicting a third technique of enriching a value census by combining data of the value census with that of a validation census, according to some embodiments. Process 500 illustrates a process executed by a data processing system in which census data is combined to produce data from which a data profile may be generated. As discussed above, the value census of a dataset may indicate counts of field-value pairs whereas a validation census may be configured (e.g., via the process of FIG. 2D) to indicate counts of validation issues for field-value pairs of the dataset.

In the example of FIG. 5A, the value census 510 is configured to include an evaluation of type of a field-value pair. The type of a field is defined by its record format, and types may include string or character fields, alphanumeric fields, numeric or decimal fields, date, time or datetime fields, binary fields, etc. Since every instance of a field-value pair will exhibit the same validity or invalidity for type (whether or not the field-value pair respects the defined type), the data processing system producing the value census may determine type validity for each field-value pair and store the resulting type validity in the value census. In some embodiments, a field may have a defined value to be treated as NULL. The NULL value is a special marker that indicates that a data value is neither valid, nor invalid, but rather does not exist. In such cases, the data processing system producing the value census may determine whether field-value pairs are NULL when determining type validity. In these cases, the type validity can either be valid, invalid, or NULL.

In the example of FIG. 5A, the value census 510 is joined with the validation census 520 in step 530 using the combination of field and value fields of the respective censuses as a join key. That is, for each of the records of the value census (which in the example of FIG. 5A each comprise the name of a field, a corresponding value of that field, a count of the instances of the field-value pair present in the database, and an indication of type validity), any records in the validation census that have a matching field name and field value are used to enrich the value census. The result of such a combination is to produce, for each field-value pair in the original dataset, a count of that field-value pair's occurrence in addition to a list of any validation issues that were found for that field-value pair. A data profile may be produced in step 540 based upon the enriched census data produced by step 530.

In the example of FIG. 5A, the validation census has been configured so that a vector of invalidity issues and respective counts is associated with each field-value pair appearing tin the validation census. As with the example of FIG. 4A, therefore, each field-value pair of the validation census appears only once, multiple instances having been "denormalized" into a vector within a single record. The length of this vector therefore is equal to the number of different invalidity reasons identified for the associated field-value pair.

Figure 5B:
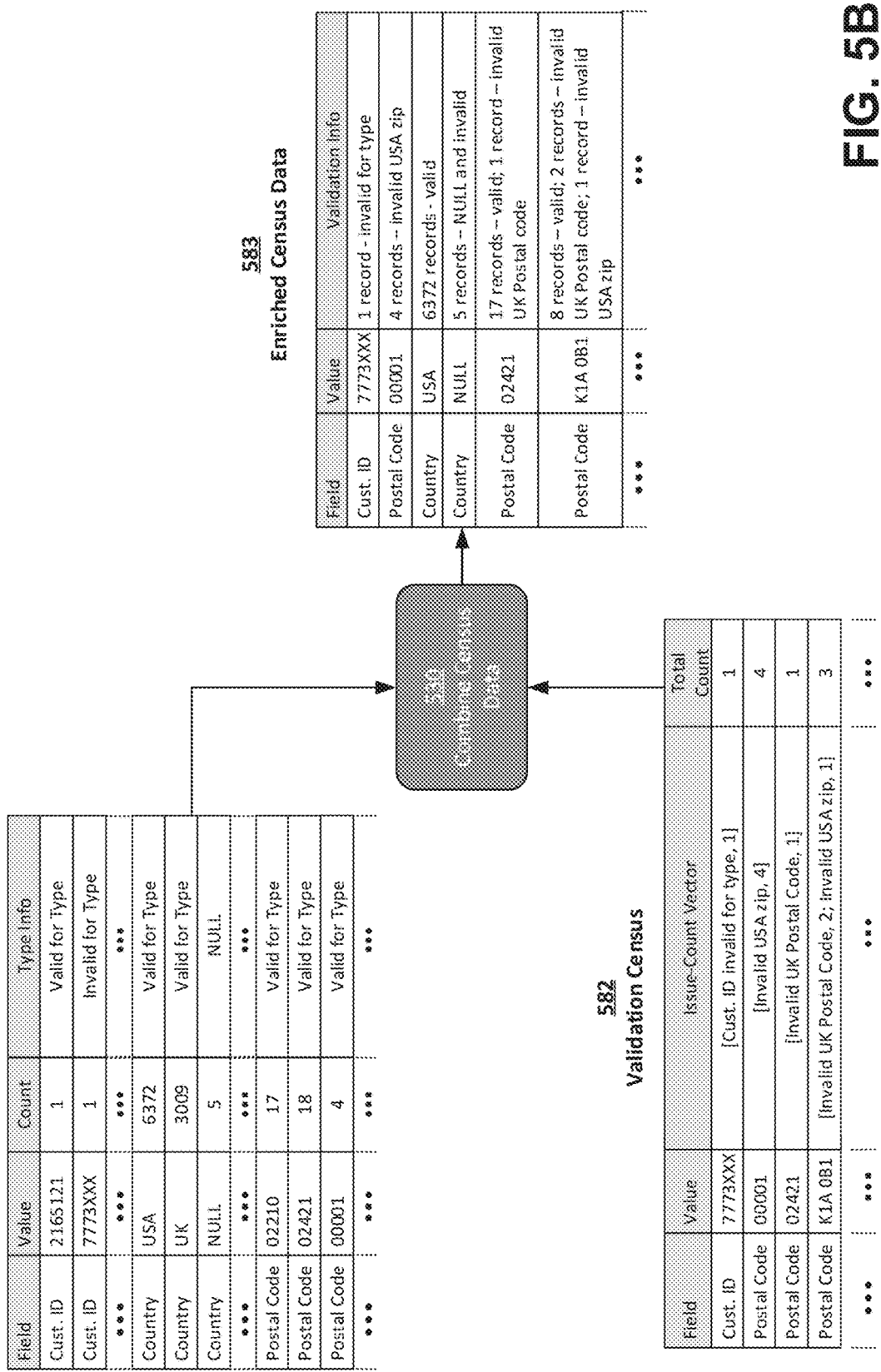
FIG. 5B is a flowchart depicting illustrative data in the process of FIG. 5A, according to some embodiments.

FIG. 5B depicts an illustrative instance of the process of FIG. 5A, according to some embodiments. To illustrate one example of data that might be processed within the process 530 of FIG. 5A, FIG. 5B depicts process 502 in which illustrative value and validation censuses are combined. In the example of FIG. 5B, illustrative value census 581 has been generated for a dataset defined according to a record format having three fields: a customer identification number ("Cust. ID"), a country and a postal code. Counts for some illustrative field-value pairs are shown in FIG. 5B. As discussed above, in the example of FIG. 5B, the value census also may include an indication of type validity for each of the field-value pairs. In addition, an illustrative validation census 582 has been generated and indicates invalidity counts and invalidity issues for several field-value pairs of the dataset. These inputs to step 530 shown in FIG. 5A, produces enriched census data 583 that indicates, for the field-value pairs of the value census, which records were valid and invalid, and for what reasons invalidity was determined when an invalid instance was identified. Enriched census data 583 includes an example where 5 instances of the Country field were NULL in the dataset, as indicated by the value census.

Figure 5C:
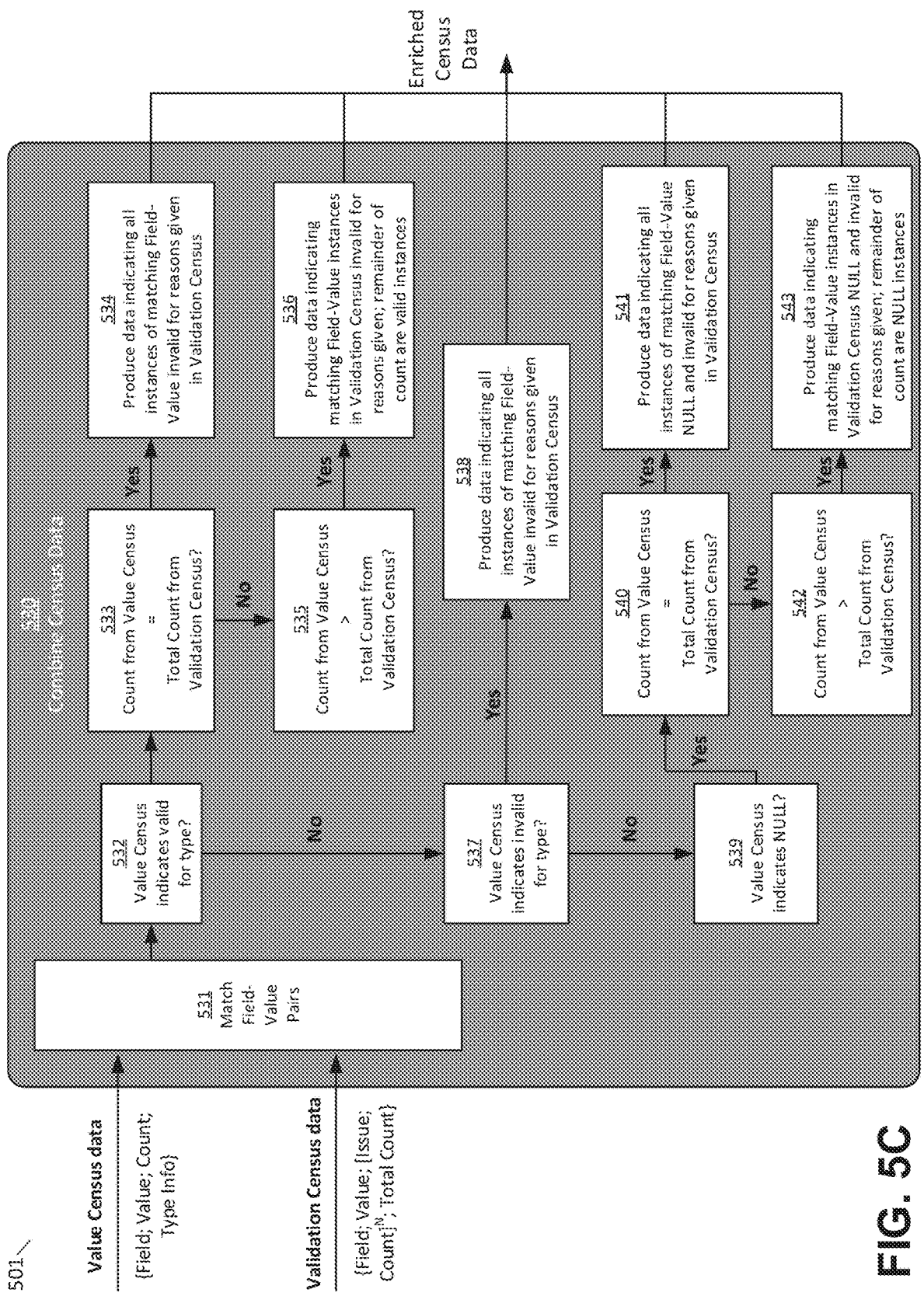
FIG. 5C is a flowchart depicting enrichment of the value census according to the third technique of FIG. 5A, according to some embodiments.

FIG. 5C depicts an illustrative approach to implementing step 530 of FIG. 5A. In the example of FIG. 5C, field-value pairs of the value census and validation census are matched in step 531. Due to the manner in which the value census and validation census have been prepared in the example of FIG. 5A, each unique combination of field and value appears no more than once in either the value census or the validation census. In some cases, a field-value pair may appear in the value census yet not appear in the validation census, indicating that every instance of this field-value pair was found to be valid. In other cases, a field-value pair may appear both in the value census and the validation census, indicating that at least some of the instances of the field-value pair were invalid.

In some embodiments, step 531 may be implemented as a join operation by the data processing system executing step 530. That is, the union of records in the value census and validation census may be produced using the combination of field and value as a join key. The resulting data may include, for each field-value pair in the value census, an indication of any issues and their counts that occurred with respect to that field-value pair (e.g., as per the vector format of the validation census 520) in addition to a count of the number of times the pair appeared in the dataset.

Irrespective of how the field-value pairs are matched in step 531, in step 532 each field-value pair appearing in the value census is examined to determine whether the value census indicates the value is valid for type. In the example of FIG. 5C, whether the value is valid for type, invalid for type, or NULL determines which of a number of possible outcomes may occur with respect to the invalidity of records identified in the validation census. The truth table for such possibilities is illustrated in FIG. 5D, in which indicates, for a given type validity result for a field-value pair, the possible results that can occur in the enriched census data. When a field-value pair is valid for type, the instances of that field-value pair may be valid or invalid, depending on the validity specification, as shown by the first row of table 560. When a field-value pair is invalid for type, the instances of that field-value pair must be invalid, at least due to the type invalidity (and possibility due to other invalidity issues as well). When a field-value pair is NULL, the instances of that field-value pair may be NULL and invalid (if there is an invalidity rule defined in the invalidity specification that indicates a NULL valid is to be considered invalid) or NULL and valid otherwise.

Returning to FIG. 5C, when the value census indicates a field-value pair is determined to be valid for type in step 532, in step 533 is it determined whether its count value in the value census is equal to the total of the count values from amongst all matching field-value pairs in the validation census. If the counts match, this indicates that all of the instances of the field-value pair were invalid in the dataset. Accordingly, in this case data is produced in step 534 that indicates all instances of this field-value pair were found invalid. In the example of FIG. 5C, data is also produced indicating for respective field-value pairs the reasons why those records were found to be invalid.

Alternatively, in step 535 a field-value pair appearing in the value census may have a count value that is greater than the total of the count values from amongst all matching field-value pairs in the validation census. This indicates that less than all of the instances of the field-value pair were found by the data processing system to be invalid. In step 535, the data processing system determines the number of valid instances of the field-value pair by subtracting the sum of all matching count values in the validation census from the count from the value census. In some cases, where the sum of all matching count value from the validation census is zero, this indicates that all of the instances of the field-value pair were found to be valid. Alternatively, only a portion of the instances of the field-value pair may have been found to be valid. In act 536, data is produced that indicates that some instances of the field-value pair were found valid and, in some cases, that also indicates that some instances of the field-value pair were found invalid. In the example of FIG. 5C, where invalid instances are identified in act 536, data is also produced indicating for respective field-value pairs the reasons why those records were found to be invalid.

It will be appreciated that, in some embodiments, it may not be necessary to perform the logical evaluation of act 534 because the sum of all matching count values from the validation census cannot exceed the count from the value census for a given field-value pair. As such, the logical evaluation of act 534 may be redundant once the logical evaluation of act 532 has been determined and found to be false. Accordingly, a data processing system may execute step 535 directly after evaluating step 532.

When the value census indicates a field-value pair is determined to be not valid for type in step 532, flow proceeds to step 537 in which the indication of type validity of the value census is examined to see whether it is invalid for type. If the field-value pair is invalid for type, in step 538 the data processing system produced data that indicates all instances of this field-value pair were found invalid. In the example of FIG. 5C, data is also produced indicating for respective field-value pairs the reasons why those records were found to be invalid.

When the value census indicates a field-value pair is determined to be not valid or invalid for type in steps 532 and 537, flow proceeds to step 539 in which the indication of type validity of the value census is examined to see whether it is NULL. If the indication of type validity of the value census is NULL, in step 540 the instance count of the value census is compared with the total count from the validation census for the same field-value pair to determine whether these counts match. If the counts match, this indicates that all of the instances of the field-value pair were NULL and invalid in the dataset. Accordingly, in this case data is produced in step 541 that indicates all instances of this field-value pair were found NULL and invalid. In the example of FIG. 5C, data is also produced indicating for respective field-value pairs the reasons why those records were found to be invalid.

Alternatively, in step 542 a field-value pair appearing in the value census may have a count value that is greater than the total of the count values from amongst all matching field-value pairs in the validation census. This indicates that less than all of the instances of the field-value pair were found by the data processing system to be invalid. In step S425, the data processing system determines the number of NULL and valid instances of the field-value pair by subtracting the sum of all matching count values in the validation census from the count from the value census. In some cases, where the sum of all matching count value from the validation census is zero, this indicates that all of the instances of the field-value pair were found to be NULL and valid. Alternatively, only a portion of the instances of the field-value pair may have been found to be NULL and valid. In act 543, data is produced that indicates that some instances of the field-value pair were found NULL valid and, in some cases, that also indicates that some instances of the field-value pair were found NULL and invalid. In the example of FIG. 5C, where NULL and invalid instances are identified in act 543, data is also produced indicating for respective field-value pairs the reasons why those records were found to be invalid.

Figure 6:
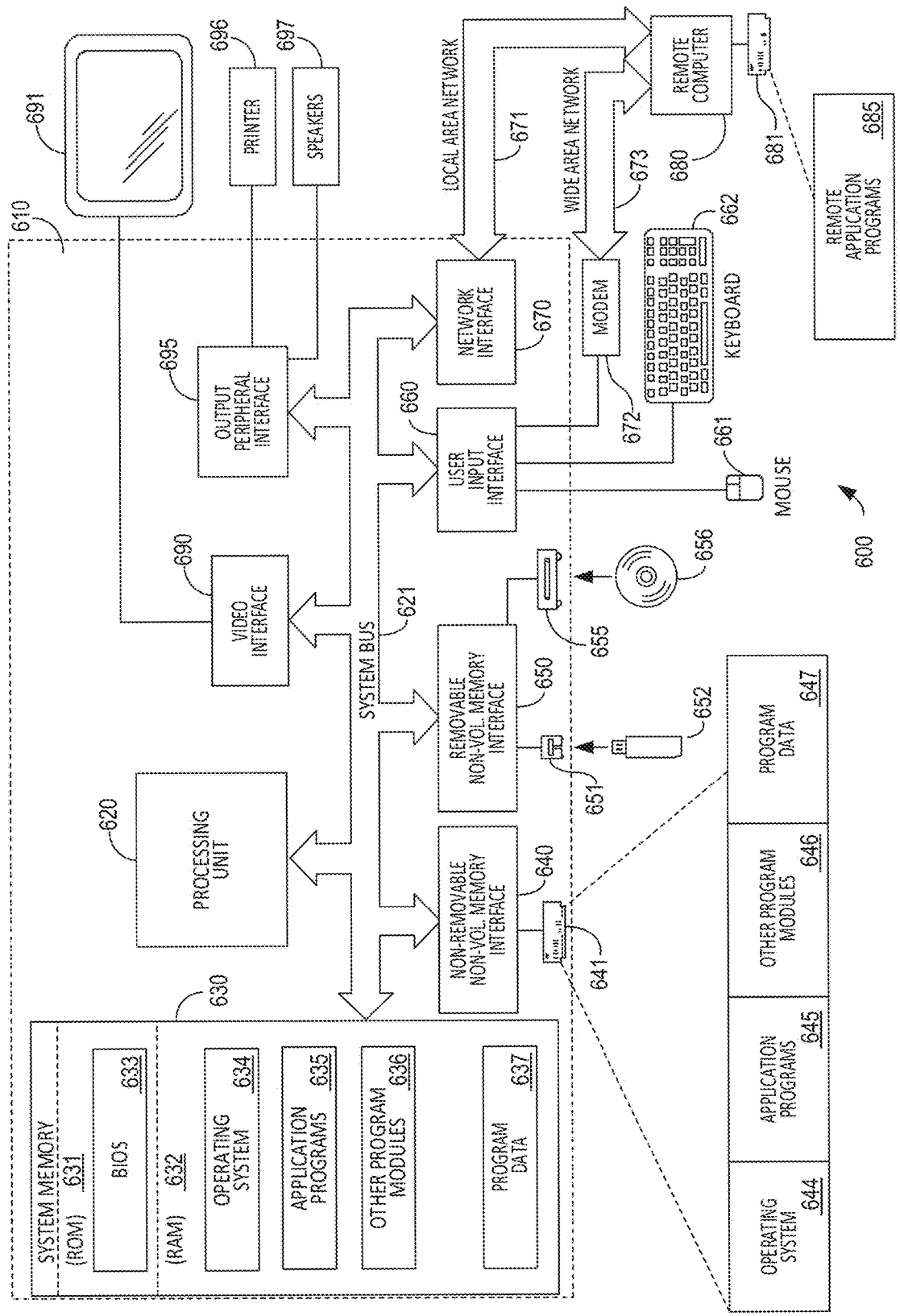
FIG. 6 illustrates an example of a computing system environment on which aspects of the invention may be implemented.

FIG. 6 illustrates an example of a suitable computing system environment 600 on which the technology described herein may be implemented. The computing system environment 600 is only one example of a suitable computing environment and is not intended to suggest any limitation as to the scope of use or functionality of the technology described herein. Neither should the computing environment 600 be interpreted as having any dependency or requirement relating to any one or combination of components illustrated in the exemplary operating environment 600.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 6, an exemplary system for implementing the technology described herein includes a general purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a flash drive 651 that reads from or writes to a removable, nonvolatile memory 652 such as flash memory, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software," when used herein, are used in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-implemented method of operating a data processing system to generate a data profile based on: a dataset having an associated record format defining a plurality of fields; a value census for the dataset comprising a first plurality of values each having an associated field of the plurality of fields and a plurality of first count values, wherein a first count value indicates a number of times a respective field and value combination occurs in the at least one dataset; and a validation specification comprising a plurality of validation rules defining criteria for invalidity for one or more fields of the plurality of fields, the method comprising:
generating a validation census based at least in part on the dataset and the validation specification, the validation census comprising a second plurality of values each having an associated field of the plurality of fields, an indication of invalidity, and a second value; and
generating a data profile of the at least one dataset based at least in part on the value census and the validation census, wherein generating the data profile comprises:
matching ones of the second plurality of values of the validation census and their associated fields with ones of the first plurality of values of the value census and their associated fields; and
for ones of the first plurality of values of the value census and their associated fields matching at least one of the second plurality of values of the validation census and their associated fields, recording in the data profile the value associated with the field, at least one indication of invalidity based on the validation census, and at least one of the second values.

2. The method of claim 1, wherein the data profile of the dataset specifies, for a first field of the plurality of fields, a number of records of the dataset that have values for the first field that are valid according to the validation specification.

3. The method of claim 1, wherein generating the validation census comprises generating indications of invalidity for one or more records of the dataset.

4. The method of claim 1, wherein the second value indicates a number of records of the dataset that are invalid according to the validation specification.

5. The method of claim 1, wherein the validation census comprises at least two different indications of invalidity that are each associated with a first value of the second plurality of values.

6. The method of claim 1, wherein the data profile of the dataset specifies, for a first field of the plurality of fields, a number of records of the dataset that have values for the first field that are null and invalid according to the validation specification.

7. The method of claim 1, further comprising generating the value census by: parsing contents of the dataset into a data structure according to the record format; collating instances of values associated with each field of the plurality of fields; and recording counts of said instances.

8. A computer system comprising:
at least one processor;
at least one user interface device; and
at least one computer readable medium comprising processor-executable instructions that, when executed, cause the at least one processor to perform a method of generating a data profile based on: a dataset having an associated record format defining a plurality of fields; a value census for the dataset comprising a first plurality of values each having an associated field of the plurality of fields and a plurality of first count values, wherein a first count value indicates a number of times a respective field and value combination occurs in the at least one dataset; and a validation specification comprising a plurality of validation rules defining criteria for invalidity for one or more fields of the plurality of fields, the method comprising:

generating, based at least in part on the dataset and the validation specification, a validation census comprising a second plurality of values each having an associated field of the plurality of fields, an indication of invalidity, and a second value; and generating, based at least in part on the value census and the validation census, a data profile of the at least one dataset by:

matching ones of the second plurality of values of the validation census and their associated fields with ones of the first plurality of values of the value census and their associated fields; and for ones of the first plurality of values of the value census and their associated fields matching at least one of the second plurality of values of the validation census and their associated fields, recording in the data profile the value associated with the field, at least one indication of invalidity based on the validation census, and at least one of the second values.

9. The computer system of claim 8, wherein the data profile of the dataset specifies, for a first field of the plurality of fields, a number of records of the dataset that have values for the first field that are valid according to the validation specification.

10. The computer system of claim 8, wherein generating the validation census comprises generating indications of invalidity for one or more records of the dataset.

11. The computer system of claim 8, wherein the second value indicates a number of records of the dataset that are invalid according to the validation specification.

12. The computer system of claim 8, wherein the validation census comprises at least two different indications of invalidity that are each associated with a first value of the second plurality of values.

13. The computer system of claim 8, wherein the data profile of the dataset specifies, for a first field of the plurality of fields, a number of records of the dataset that have values for the first field that are null and invalid according to the validation specification.

14. The computer system of claim 8, wherein the processor-executable instructions further cause the at least one processor to generate the value census by: parsing contents of the dataset into a data structure according to the record format; collating instances of values associated with each field of the plurality of fields; and recording counts of said instances.

15. A computer system for generating a data profile based on: a dataset having an associated record format defining a plurality of fields; a value census for the dataset comprising a first plurality of values each having an associated field of the plurality of fields and a plurality of first count values, wherein a first count value indicates a number of times a respective field and value combination occurs in the at least one dataset; and a validation specification comprising a plurality of validation rules defining criteria for invalidity for one or more fields of the plurality of fields; comprising:

at least one processor;

means for generating, based at least in part on the dataset and the validation specification, a validation census comprising a second plurality of values each having an associated field of the plurality of fields, and a plurality of indications an indication of invalidity, and a second value; and means for generating, based at least in part on the value census and the validation census, a data profile of the at least one dataset by:

matching ones of the second plurality of values of the validation census and their associated fields with ones of the first plurality of values of the value census and their associated fields; and for ones of the first plurality of values of the value census and their associated fields matching at least one of the second plurality of values of the validation census and their associated fields, recording in the data profile the value associated with the field, at least one indication of invalidity based on the validation census, and at least one of the second values.

* * * * *

UNITED STATES PATENT AND TRADEMARK OFFICE
CERTIFICATE OF CORRECTION

PATENT NO. : 11,068,540 B2  
APPLICATION NO. : 15/880279  
DATED : July 20, 2021  
INVENTOR(S) : Joel Gould et al.

Page 1 of 1

It is certified that error appears in the above-identified patent and that said Letters Patent is hereby corrected as shown below:

In the Claims

At Column 24, Claim 15, Lines 27-28:
"associated field of the plurality of fields, and a plurality of indications an indication of invalidity, and a second"
Should read:
"associated field of the plurality of fields, an indication of invalidity, and a second"

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*